US009016576B2

(12) United States Patent
Brady et al.

(10) Patent No.: US 9,016,576 B2
(45) Date of Patent: Apr. 28, 2015

(54) LASER SCANNING CODE SYMBOL READING SYSTEM PROVIDING IMPROVED CONTROL OVER THE LENGTH AND INTENSITY CHARACTERISTICS OF A LASER SCAN LINE PROJECTED THEREFROM USING LASER SOURCE BLANKING CONTROL

(71) Applicant: Metrologic Instruments, Inc., Blackwood, NJ (US)

(72) Inventors: Robert Hugh Brady, Brookfield, CT (US); Stephen Colavito, Marcus Hook, PA (US); David Wilz, Sr., Sewell, NJ (US); Zhipeng Teng, Suzhou (CN); Myron Levon Dixon, Cherry Hill, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/897,512

(22) Filed: May 20, 2013

(65) Prior Publication Data
US 2013/0306730 A1  Nov. 21, 2013

Related U.S. Application Data

(60) Provisional application No. 61/632,426, filed on May 21, 2012.

(51) Int. Cl.
*G06K 7/10* (2006.01)
(52) U.S. Cl.
CPC ........ *G06K 7/10792* (2013.01); *G06K 7/10554* (2013.01); *G06K 7/10801* (2013.01)

(58) Field of Classification Search
USPC ........................................................ 235/455
See application file for complete search history.

(56) References Cited

U.S. PATENT DOCUMENTS

| | | | |
|---|---|---|---|
| 5,250,791 A * | 10/1993 | Heiman et al. ........... 235/462.21 |
| 5,302,813 A | 4/1994 | Goren | |
| 5,340,971 A | 8/1994 | Rockstein et al. | |
| 5,742,042 A | 4/1998 | Scofield | |
| 5,787,103 A | 7/1998 | Coleman | |
| 6,082,621 A | 7/2000 | Chan et al. | |
| 6,095,421 A | 8/2000 | Barkan et al. | |
| 6,209,788 B1 | 4/2001 | Bridgelall et al. | |
| 6,247,647 B1 | 6/2001 | Courtney et al. | |
| 6,827,272 B2 | 12/2004 | Kolstad | |
| 7,042,484 B2 | 5/2006 | Cervantes | |

* cited by examiner

*Primary Examiner* — Jamara Franklin
(74) *Attorney, Agent, or Firm* — Additon, Higgins & Pendleton, P.A.

(57) ABSTRACT

Method of and system for reading bar code symbols using a hand-supportable laser scanning bar code symbol reading system supporting an improved level control over the length and intensity characteristics of laser scan lines projected onto scanned objects, at any instant in time, in a manner dependent the detected location, distance or range of the scanned object in the scanning field of the system during system operation. The system includes a laser scanning module that projects the laser scanning beam through a light transmission window, and across a laser scanning field in which an object is located, while the laser scanning beam is blanked out during the laser scanning cycle according to a laser source blanking function that is determined by the estimated distance, or data representative thereof.

20 Claims, 13 Drawing Sheets

LASER SCANNING CODE SYMBOL READING SYSTEM PROVIDING IMPROVED CONTROL OVER THE LENGTH AND INTENSITY CHARACTERISTICS OF A LASER SCAN LINE PROJECTED THEREFROM USING LASER SOURCE BLANKING CONTROL

CROSS-REFERENCE TO PRIORITY APPLICATION

The present application claims the benefit of U.S. Patent Application No. 61/632,426 for a Laser Scanning Code Symbol Reading System Providing Improved Control over the Length and Intensity Characteristics of a Laser Scan Line Projected Therefrom Using Laser Source Blanking Control, filed May 21, 2012, which is hereby incorporated by reference in its entirety.

BACKGROUND

1. Field of Disclosure

The present disclosure relates to an improved method of and apparatus for reading bar code symbols in diverse scanning environments using laser scanning beam technology.

2. Brief Overview of the State of the Art

Typically, single line laser scanning bar code symbol reading systems have a nominal scan angle which controls the width (i.e. length) of the scan line projected onto a target surface. In most designs, this scan angle is fixed and the scan line length, at a given scanning distance, is sufficient in most cases.

However, there are applications, such as bar code menu scanning and tong-range scanning, where there is a need for greater flexibility in control over the length and intensity characteristics of the laser scan line, so as to avoid undesirable beam energy characteristics occurring at the extreme locations of the laser scan line, where the laser scanning beam decelerates, stops completely, and then accelerates in the opposite direction during each half of a complete laser beam scanning cycle.

There is a great need in the art to provide an improved laser scanning code symbol reading system having an improved level control over the length and intensity characteristics of a laser scan line, while avoiding the shortcomings and drawbacks of prior art methodologies and apparatus.

OBJECTS OF PRESENT DISCLOSURE

A primary object of the present disclosure is to provide an improved laser scanning code symbol reading system having an improved level of control over the length and intensity characteristics of a laser scan line, without the shortcomings and drawbacks of prior art apparatus and methodologies.

Another object is to provide a laser scanning code symbol reading system controlling the length and intensity characteristics of a laser scan line by automatically deactivating its laser beam source when the laser beam reaches its extreme end positions along the laser scan line, that is, where the laser beam decelerates to a stop, and then accelerates in the opposite direction, to improve laser safety conditions and/or aesthetic characteristics of the laser scan line projected from the laser scanning code symbol reading system.

Another object is to provide a laser scanning code symbol reading system controlling the length and intensity characteristics of a laser scan line by automatically deactivating its laser beam source only when the laser beam reaches its extreme end positions along the laser scan line, to thereby eliminate any intensity variations occurring at the end of a laser scan line, because of the deceleration/stopping/acceleration motion of the laser scanning beam at the end of laser scan line.

Another object is to provide such a laser scanning code symbol reading system, wherein the length and intensity characteristics of a laser scan line are controlled by programmed firmware, responsive to start of scan (SOS) and end of scan (EOS) signals generated by an SOS/EOS detector, and automatically deactivating a laser beam source only when the laser beam reaches its extreme end positions along the laser scan line, where laser beam speed variations are significant due to the deceleration/stopping/acceleration motion characteristics of the laser beam at the end positions of the laser scan line.

Another object of the present invention is to provide such a laser scanning code symbol reading system, wherein by controlling the time of operation of the visible laser diode source, during each laser scanning cycle, the system can effectively scan objects with laser scanning lines of a specific length projected on the object to be scanned.

Another object of the present invention is to provide such a laser scanning code symbol reading system, wherein the visible laser diode source is deactivated during each laser scanning cycle so that the laser beam is not generated at the end of the sweep angle, thereby eliminating undesirable laser beam bright spots created when the laser scanning beam changes its beam direction at each end of each scanning cycle.

Another object is to provide a hand-supportable long-range laser scanning code symbol reading system that employs a visible laser diode (VLD) and beam shaping/focusing optics for producing a visible laser beam that scans objects over a long range portion of the scanning field of the system, wherein the visible laser beam is automatically deactivated when the laser beam reaches its end positions along the laser scan line, to thereby limit the length of a laser scan line.

Another object is to provide a hand-supportable long-range laser scanning code symbol reading system that employs a visible laser diode (VLD) and beam shaping/focusing optics for producing a visible laser beam that scans objects over a long range portion of the scanning field of the system, wherein the range of the object is determined by the intensity/ magnitude of the return laser beam, and the length of the laser scan line is controlled by automatically deactivating the visible laser diode for a time duration determined by the table of range data vs. scan angle laser source activation, and the acquired range data.

Another object is to provide an automatically-triggered hand-supportable dual-laser scanning bar code symbol reading system having the capacity to automatically control the length and intensity characteristics of a projected laser scan line from one of two laser sources, at any instant in time, in a manner dependent on the detected location of the scanned object in the field of view of the system, during system operation.

Another object is to provide such an automatically-triggered hand-supportable dual laser scanning code symbol reading system that employs a first visible laser diode (VLD) and first beam shaping/focusing optics for producing a first visible laser beam adapted for scanning objects over a first (long) range portion of the scanning field of the system, and a second visible laser diode (VLD) and second beam shaping/ focusing optics for producing a second visible laser beam adapted for scanning objects over a second (short) range portion of the scanning field of the system, and wherein the first visible laser beam is automatically deactivated when the first laser beam reaches its end positions along the laser scan line, to thereby limit (i.e. shorten) the length (i.e. width) of a laser scan line, and prevent generating a slow or stationary laser beam during the extreme portions.

Another object is to provide such a hand-supportable dual laser scanning code symbol reading system, wherein the optical alignment and input power of each VLD is controlled, and a common laser scanning mechanism is employed for scanning both laser scanning beams, but at different scanning rates, such that the first (short) range laser beam is scanned at a faster rate than the second (long) range laser beam, and the scanning rates are balanced to permit the same decoding electronics to be used by both laser scanning beam (e.g. if the short range subsystem is designed for a maximum signal frequency of 100 KHz at a certain scan rate, then the scan rate for the long range subsystem would be chosen so that the maximum signal frequency is also 100 KHz).

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION OF THE ILLUSTRATIVE EMBODIMENTS

Figure 1:
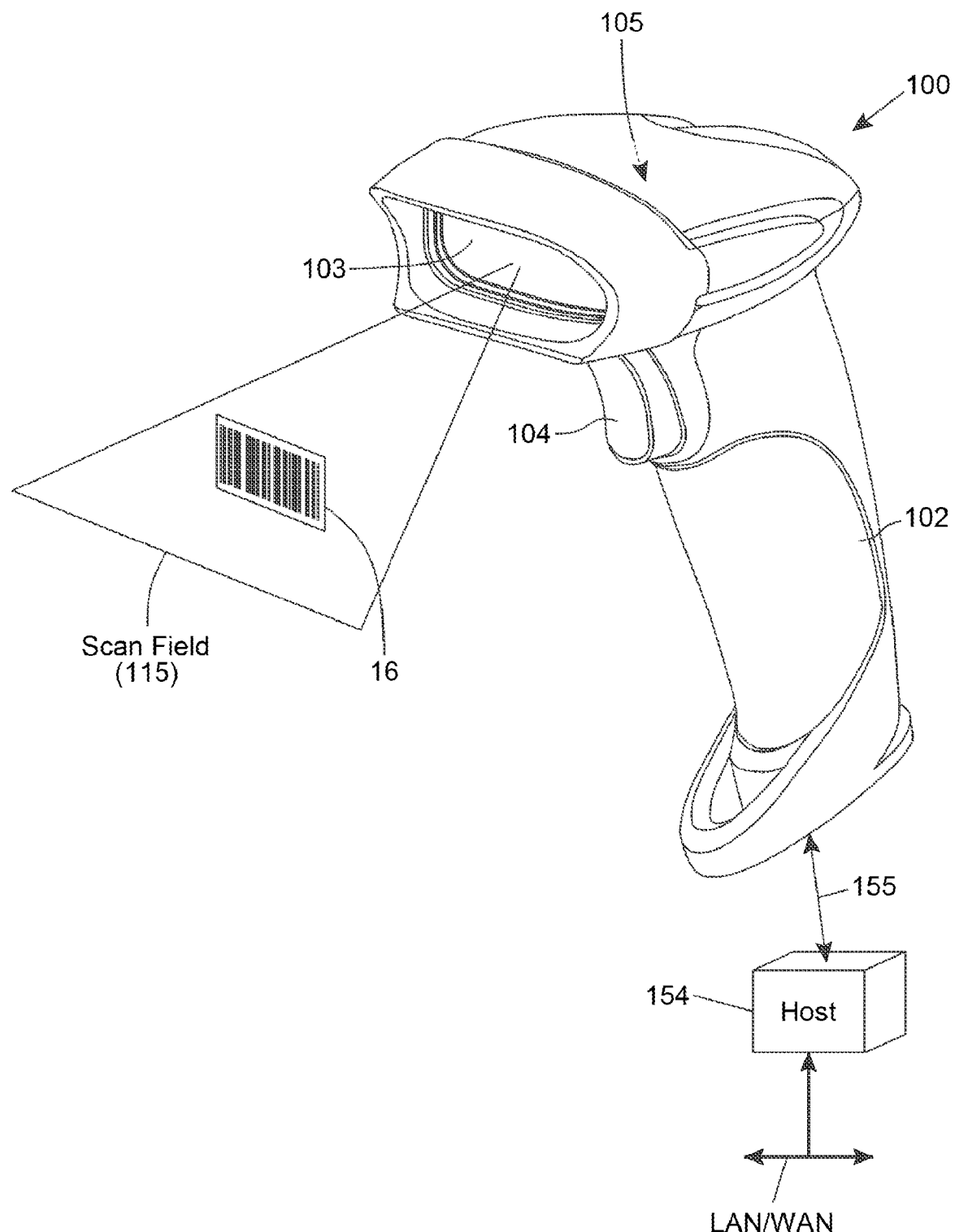
FIG. 1 is a perspective view of a first illustrative embodiment of a manually-triggered hand-supportable laser scanning bar code symbol reading system having the capacity to automatically control the length and intensity characteristics of a projected laser scan line at any instant in time, in a manner dependent on programming parameters and/or operating conditions during system operation.

Referring to the figures in the accompanying Drawings, the illustrative embodiments of the dual laser-scanning bar code symbol reading system and will be described in great detail, wherein like elements will be indicated using like reference numerals.

Manually-Triggered Hand-Supportable Laser Scanning Code Symbol Reading System Employing Programmed Laser Source De-Activation (i.e. Blanking) Control Referring now to FIGS. 1 through 5, a first illustrative embodiment of a manually-triggered hand-supportable laser scanning bar code symbol reading system 1 will be described in detail. As will be described in the first illustrative embodiment below, programmed laser source de-activation (i.e. blanking) is used so that the end portions of each laser scan line, projected onto an object at any scanning distance, are substantially-free of bright spots or hot-spots, along the intensity profile of the scanning beam typically caused by the stopping of the laser beam and its reversal in direction of travel, at the end of each scan line during each scanning cycle. It is understood, however, that such programmed laser source de-activation (i.e. blanking) can be also used to achieve other kinds of scan line length and intensity control during each laser scanning cycle within a laser scanning system.

Figure 2:
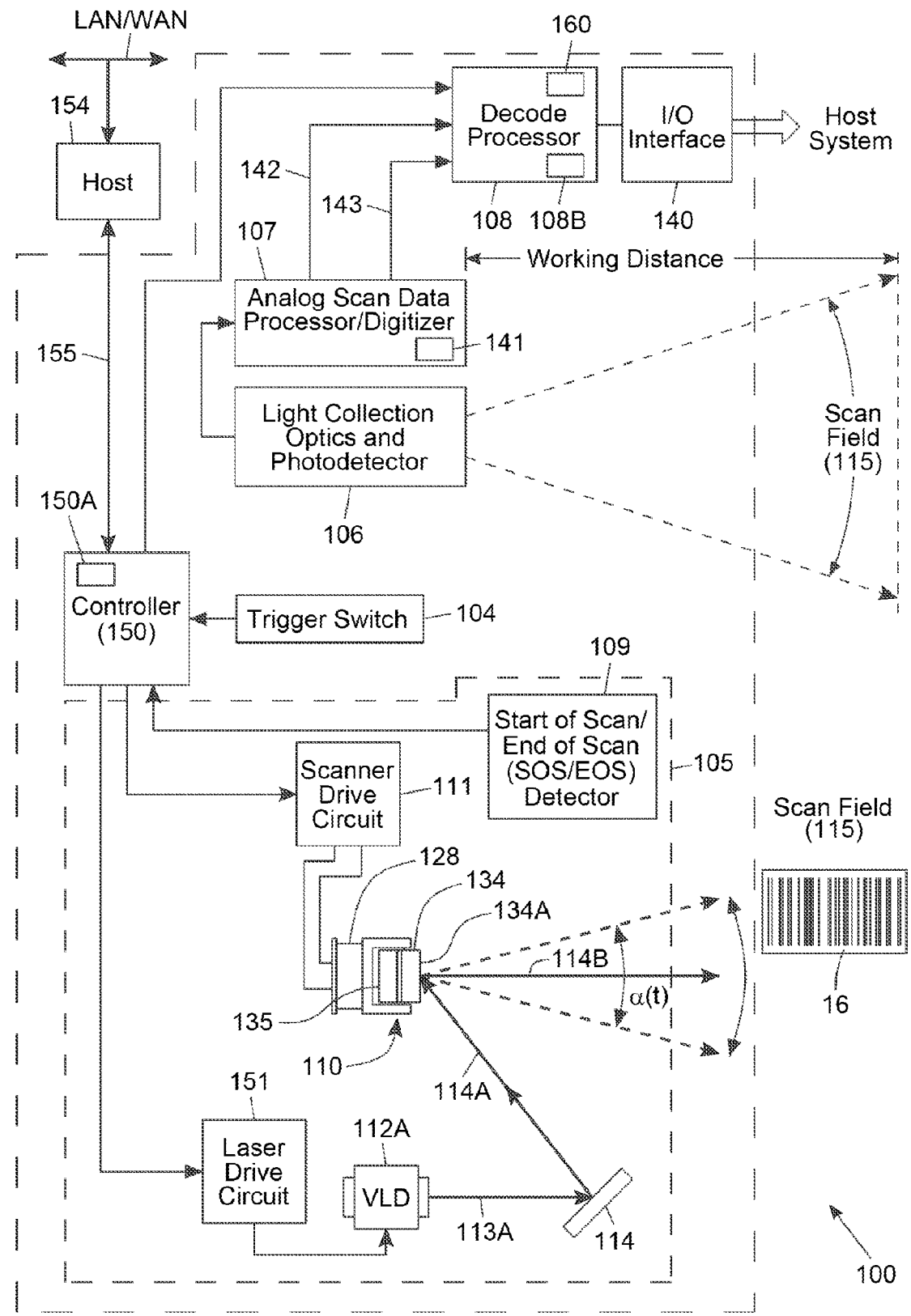
FIG. 2 is a schematic block diagram describing the major system components of the manually-triggered laser scanning bar code symbol reading system illustrated in FIG. 1.
Figure 3:
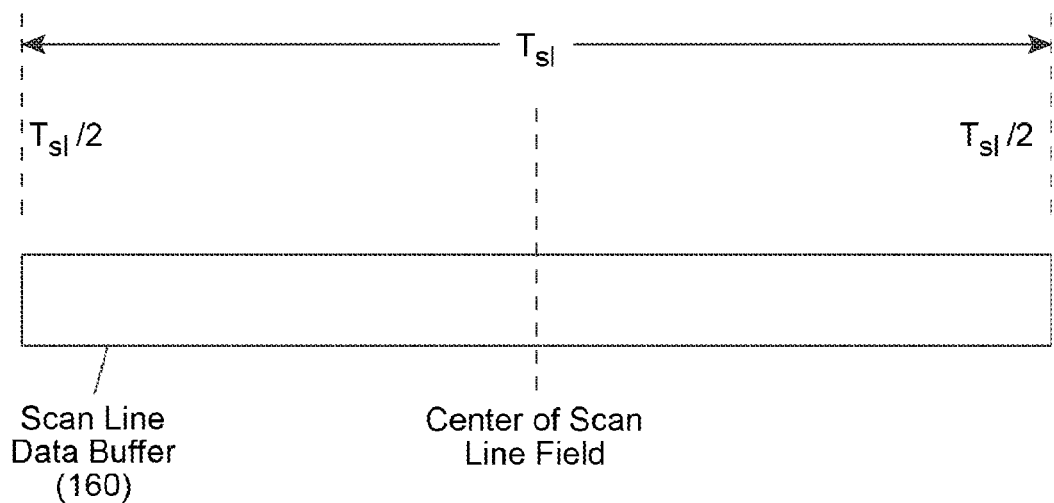
FIG. 3 is a schematic representation of a scan line data buffer maintained by the decode processor of the system of FIG. 1 during laser scanning operations, and holding a line of digital scan data for each laser scan direction during each laser scanning cycle.

As shown in FIGS. 1 and 2, the manually-triggered laser scanning bar code symbol reader 100 has a working distance, and an assembly of components comprising: a hand-supportable housing 102 having a head portion and a handle portion supporting the head portion; a light transmission window 103 integrated with the head portion of the housing 102; a manually-actuated trigger switch 104 integrated with the handle portion of the housing, for generating a trigger event signal to activate laser scanning module 105 with laser scanning field 115; a laser scanning module 105, for repeatedly scanning, across the laser scanning field, a visible laser beam generated by a laser source 112 (e.g. VLD or IR LD) having optics to produce a laser scanning beam focused in the laser scanning field, in response to control signals generated by a system controller 150; wherein the laser scanning module 105 also includes a laser drive circuit 151 for receiving control signals from system controller 150, and in response thereto, generating and delivering laser (diode) drive current signals to the laser source 112A; a start of scan/end of scan (SOS/EOS) detector 109, for generating timing signals indicating the start of laser beam sweep, and the end of each laser beam sweep, and sending these SOS/EOS timing signals to the system controller 150, as well as decode processor 108; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure and transmitted to decode processor 108 via lines 142; a set of scan line data buffers 160 for buffering each complete line of scan data collected during a complete sweep of the laser scanning beam across the laser scanning field during each scanning cycle (e.g. two scan data line buffers for buffering data collected during scanning directions); programmed decode processor 108 for decode processing digitized data stored in said scan line data buffer 160, and generating symbol character data representative of each bar code symbol scanned by the laser scanning beam; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system, wherein the system controller 150 includes a VLD blanking control module 150A for programming or setting an appropriate laser source (VLD) de-activation (i.e. blanking) function, B(t), for use by the laser drive circuit 151 to de-activate the laser source 112A at particular instances during each laser scanning cycle, so as to blank out (i.e. turn off) the laser scanning beam at such instances during the laser scanning cycle, according to the laser source blanking function B(t).

Notably, the VLD blanking function B(t) can be specified in a number of possible ways, including, but not limited to: (i) for symmetrical VLD blanking functions B(t), by specifying one percentage of time ($P_A$, $P_A$) measured from the center of each scanning cycle, indicating how long the VLD should be deactivated, during each scanning cycle having a total time duration $T_{SC}$; and (ii) for asymmetrical VLD blanking functions B(t), specifying two different percentages of time ($P_A$, $P_B$) measured from the off-center location of each scanning cycle, indicating how long the VLD should be deactivated during each scanning cycle having a total time duration $T_{SC}$. The total time duration of each scanning cycle, $T_{SC}$, can be determined from the scanning speed of the scanning assembly which will be maintained substantially constant during scanning operations.

As shown in FIG. 2, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A as incident beam 114A towards the mirror component of the laser scanning assembly 110, which sweeps the deflected laser beam 114B across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current $I_{DC}(t)$ supplied to the electromagnetic coil 128 during scanning operations. In general, the greater the level of drive current $I_{DC}(t)$ produced by scanner drive circuit 111, the greater the forces exerted on permanent magnet 135 and its associated scanning element. Thus, scan sweep angle α(t) of the scanning module 105 can be directly controlled by controlling the level of drive current $I_{DC}(t)$ supplied to the coil 128 by the scanner drive circuit 111 under the control of controller 150, shown in FIG. 2. In the present disclosure, locking the drive current $I_{DC}(t)$ will be the preferred method of controlling (i.e. maintaining constant) the scan sweep angle α(t) during scanning operations.

In general, system 100 supports a manually-triggered mode of operation, and a bar code symbol reading method described below.

In response to the manual actuation of trigger switch 104, the laser scanning module 105 generates and projects a laser scanning beam through the light transmission window 103, and across the laser scanning field 115 external to the hand-supportable housing, for scanning an object in the scanning field. The laser scanning beam is generated by the laser source 112B in response control signals generated by the system controller 150. During laser scanning operations, the VLD blanking control module 150A sets an appropriate VLD blanking function B(t) for the laser drive circuit 151, based on system control parameters (SCPs) set at any instant in time. The VLD blanking function B(t) specifies when, during each laser scanning cycle, the VLD 112A will be automatically deactivated (i.e. de-energized) by the laser drive circuit 151, and thus, when visible laser light will not be produced and emitted into the scanning field, as the electromagnetic scanning assembly 110 attempts to sweep a laser scanning beam across the laser scanning field and any object along its scanning path, during specified laser blanking intervals. The scanning element (i.e. mechanism) 134 repeatedly scans the laser beam across the object in the laser scanning field, at the constant scan sweep angle $\alpha(t)$ set by the controller 150 during scanning operation. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations.

To implement the VLD blanking function B(t), the firmware within system controller 150 detects the start of scan (SOS) signal from SOS/EOS detector 109, which signals the beginning of each new scan line. The firmware in programmed controller 150 is also able to compute the approximate time associated with a full scan line, based on the scanning speed of the laser scanning mechanism. In the illustrative embodiment, the approximate time duration of a full scan line, $T_{SL}$, is 10 milliseconds, but may vary from embodiment to embodiment. Based on this full scan line time duration $T_{SL}$, the firmware looks up the specified VLD blanking function B(t) specified by the system control parameters (SCPs) programmed within the system, and from this VLD blanking function, determines the required VLD blanking percentages, and uses these figures to control the VLD drive circuit 151, to de-energize and energize the VLD during the scan sweep to produce the desired laser beam blanking effect along the projected laser scan line. For example, if the blanking percentage is 10, then the VLD drive circuit 151 will blank the VLD for 10 percent of the 10 milliseconds of the scan sweep time duration, which is total of 1 milliseconds of the scan sweep time duration. The controller firmware (i.e. module 150A) would then blank the VLD for the first 0.5 milliseconds and the last 0.5 milliseconds of the scan sweep time duration of the laser scanning beam to produce the desired laser beam blanking effect along the projected laser scan line.

The analog scan data signal processor/digitizer 107 processes the analog scan data signal and converts the processed analog scan data signals into digitized data signals. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 5:
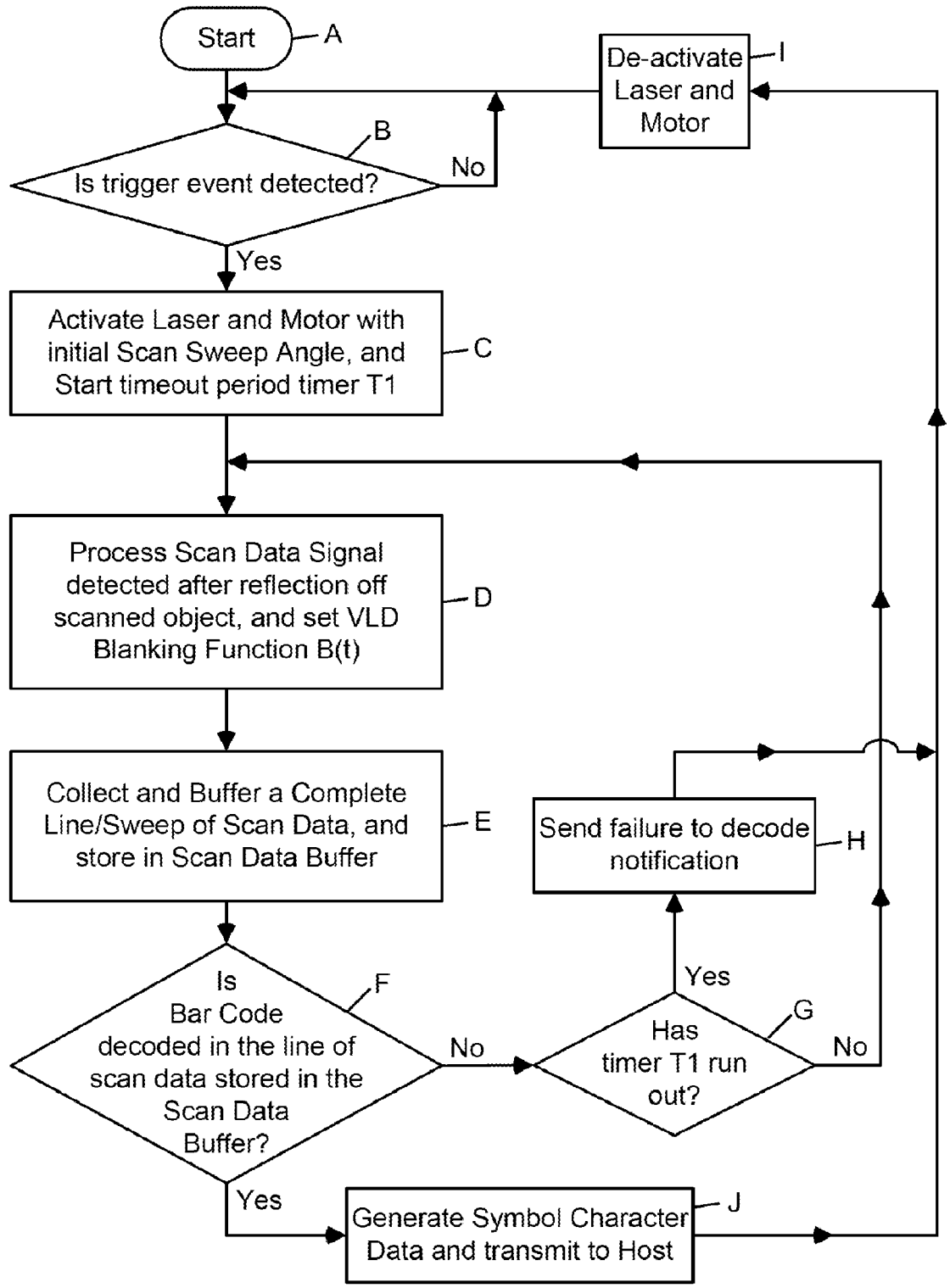
FIG. 5 sets forth a flow chart describing the primary steps carried out in the laser scanning bar code symbol reading system of FIG. 1, during each laser scanning cycle regardless of where the object is located within the scanning field of the system.

Referring to FIG. 5, the method of reading bar code symbols and controlling operations within the laser scanning bar code reader 100 will be described in greater detail.

As indicated in FIG. 5, the process orchestrated by system controller 150 begins at the START Block A, where all system components are activated except for the laser and scanning motor (i.e. electromagnetic coil). Then at Block B in FIG. 5, the system controller determines if a trigger or activation event has occurred (i.e. trigger switch 104 has been manually depressed by the operator).

In the event that a trigger event has been detected at Block B in FIG. 5, then the system controller proceeds to Block C, and (i) activates the laser diode, and scanner drive circuit 111 with a sufficient current to generate the specified scan sweep angle, and a VLD blanking function B(t) for the scanning process, and (ii) then starts timeout period timer T1.

At Block D in FIG. 5, the analog scan data signal processor/digitizer ASIC 107 processes the return analog and/or digital scan data signals.

Figure 4:
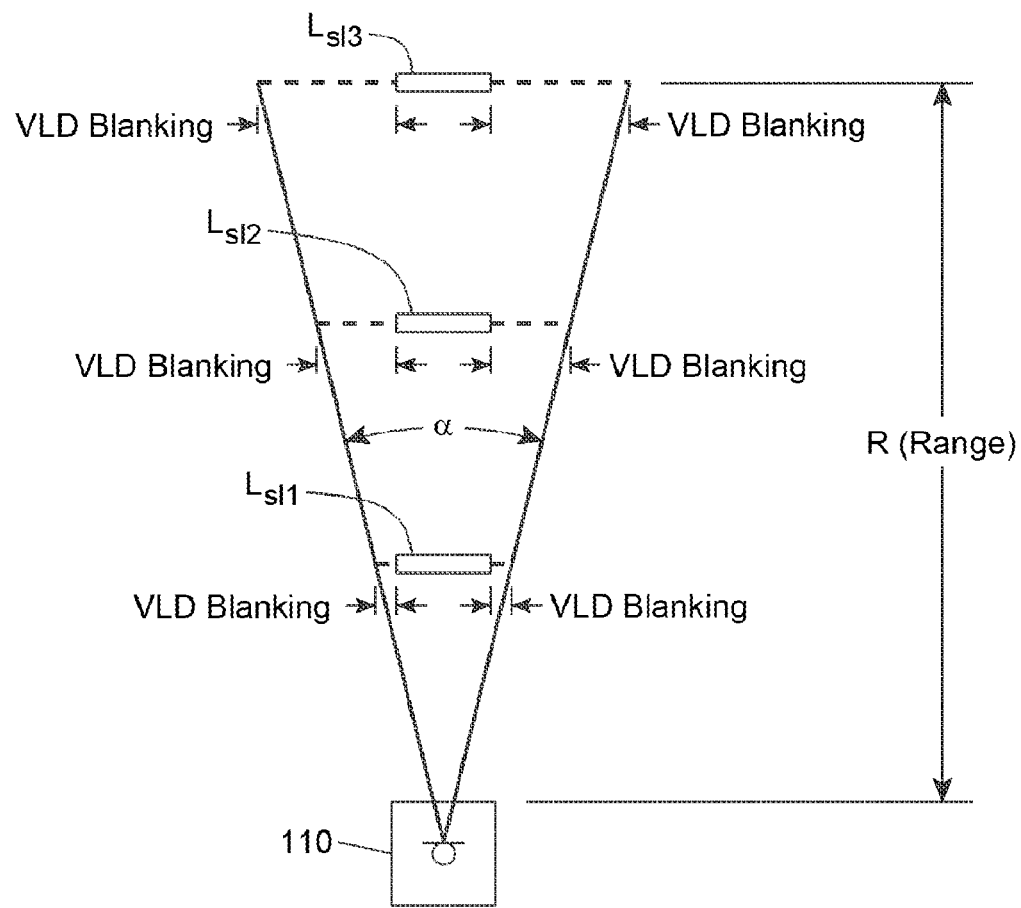
FIG. 4 is a schematic representation of a VLD in the laser scanning bar code symbol reading system of FIG. 1, generating and projecting three different laser scanning beams onto an object at three different scanning distances or ranges, so that the end portions of each laser scan line, projected onto an object at any scanning distance, are substantially-free of bright spots or hot-spots (in the intensity profile of the scanning beam), typically caused by the stopping of the laser beam and its reversal in direction of travel, at the end of each scan line during each scanning cycle.

At Block E in FIG. 4, the system controller commands the buffering, in a scan data buffer 160, of a complete line of scan data collected for scanning directions, over a full scan sweep angle and VLD blanking function B(t) set during the scanning cycle. Scan data from each scan direction is buffered in a different scan line data buffer.

At Block F in FIG. 5, the system controller determines whether the decode processor 108 has decoded a bar code symbol based on the line of scan collected and buffered in the scan data buffer 160.

If, at Block F in FIG. 5, a bar code symbol has not been decoded (i.e. read) within the buffered line of scan data, then the system controller proceeds to Block G and determines whether or not the time out period T1 has been reached. If the time out period has not been reached, then the system controller returns to Block D, and processes the scan data signals. Thereafter, the system controller proceeds to Block E and attempts to collect and decode scan data within time period T1 remaining. If the time out period has been reached at Block G, then the system controller proceeds to Block GH, sends a failure to decode notification to host system, and then at Block I, de-activates the laser source and scan motor, and then returns to Block B, as shown in FIG. 5.

By virtue of the novel control process described in FIG. 5, the bar code symbol reader has the capacity to dynamically adjust the time a visible laser scanning beam is actively emitted and not emitted from the VLD 112A during each laser scanning cycle. Specifically, the bar code symbol reader with its implemented VLD blanking function, automatically ensures that the beam intensity at the end of each scan line projected onto the scanned object, is never too bright or creates hot-spots when the laser beam stops its motion, and changes direction at the end of each scan line, during each scanning cycle.

Automatically-Triggered Hand-Supportable Laser Scanning Bar Code Symbol Reading System Employing Range-Dependent Laser Source De-Activation (i.e. Blanking) Control Referring to FIGS. 6 through 10B, a second illustrative embodiment of an automatically-triggered hand-supportable laser scanning bar code symbol reading system 500 will be described in detail. As will be described in the second illustrative embodiment below, range-dependent laser source de-activation (i.e. blanking) is used within the system 500 to control the length of each laser scan line, projected onto an object at any scanning distance, so that the scan line length is substantially constant, over the working distance of a dual-VLD laser scanning system. It is understood, however, that range-dependent laser source de-activation (i.e. blanking) can be also used to achieve other kinds of scan line length and intensity control during each laser scanning cycle within a laser scanning system.

Figure 6:
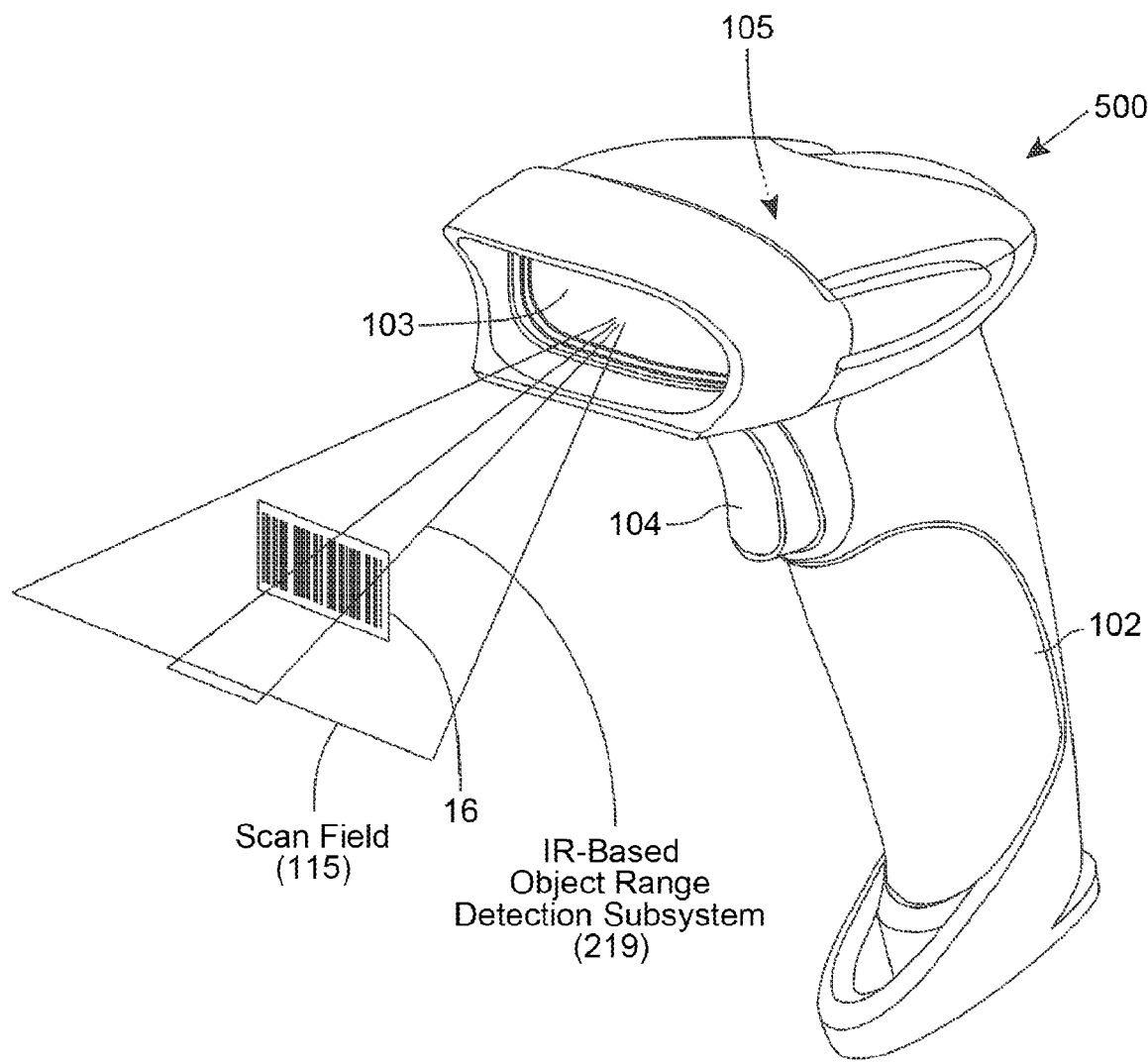
FIG. 6 is a perspective view of a second illustrative embodiment of an automatically-triggered hand-supportable dual-laser scanning bar code symbol reading system having the capacity to automatically control the length and intensity characteristics of a projected laser scan line from one of two laser sources, at any instant in time, in a manner dependent the detected location of the scanned object in the field of view of the system, during system operation.
Figure 7:
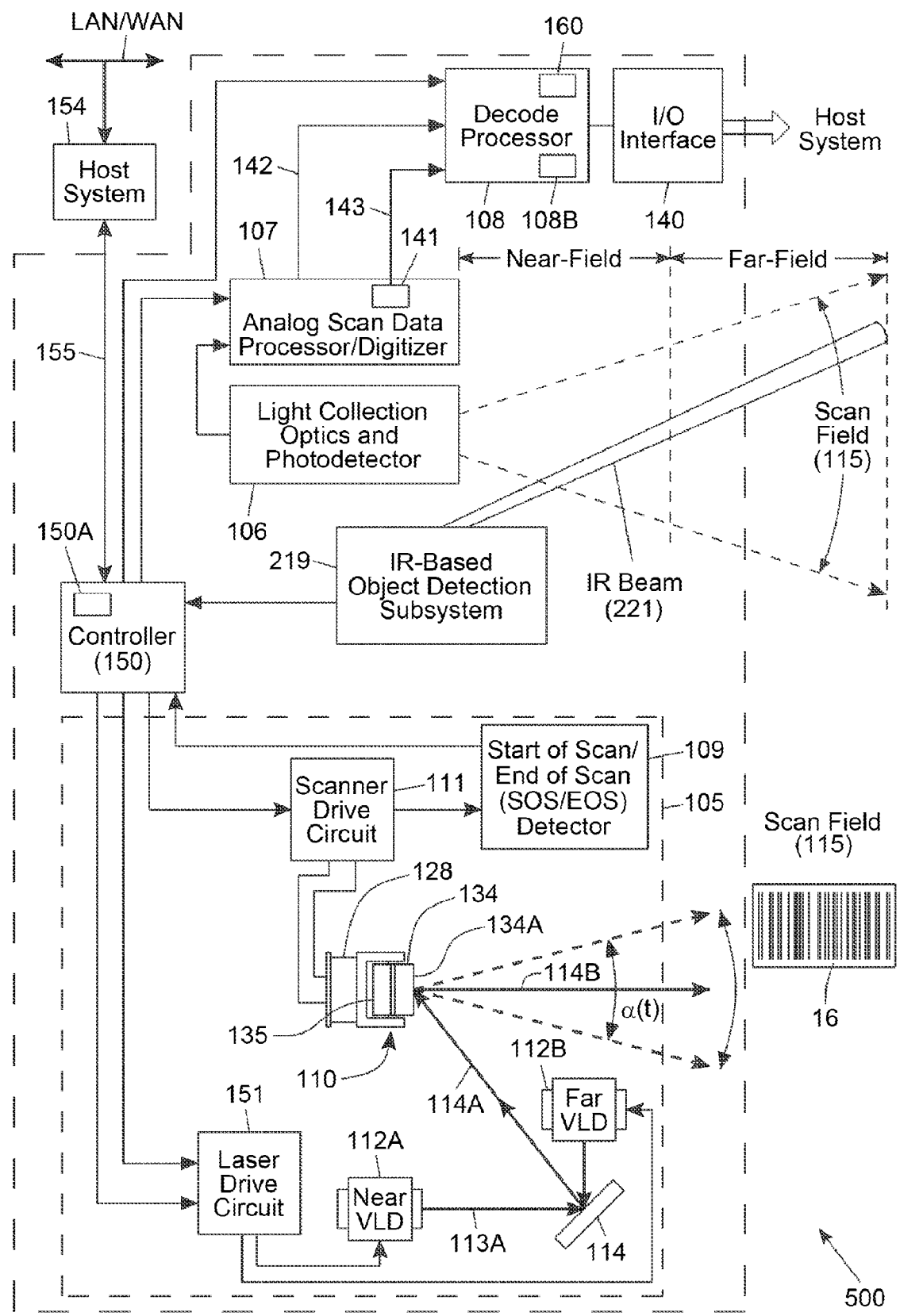
FIG. 7 is a schematic block diagram describing the major system components of the automatically-triggered dual-laser scanning bar code symbol reading system illustrated in FIG. 6.
Figure 8:
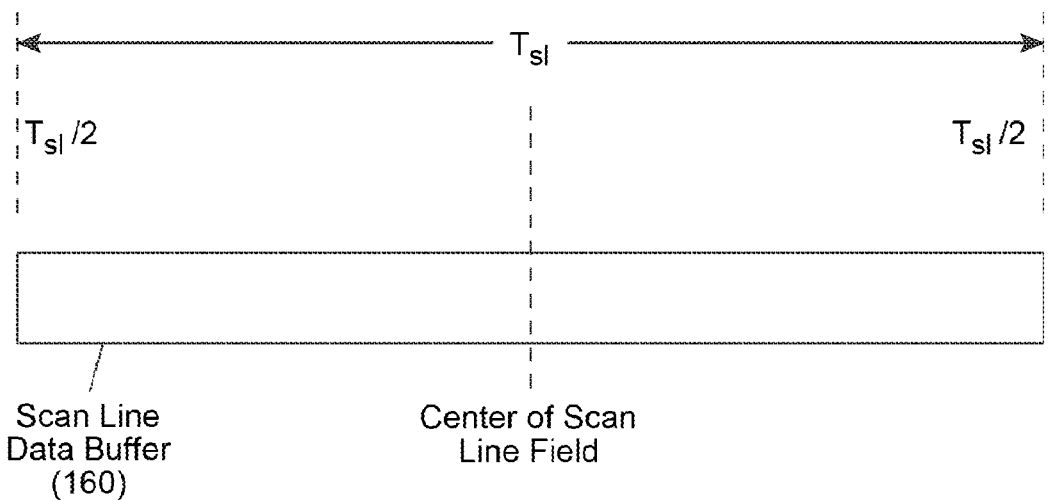
FIG. 8 is a schematic representation of a scan line data buffer maintained by the decode processor of the system of FIG. 6 during laser scanning operations, and holding a line of digital scan data for each laser scan direction during each laser scanning cycle.
Figure 9:
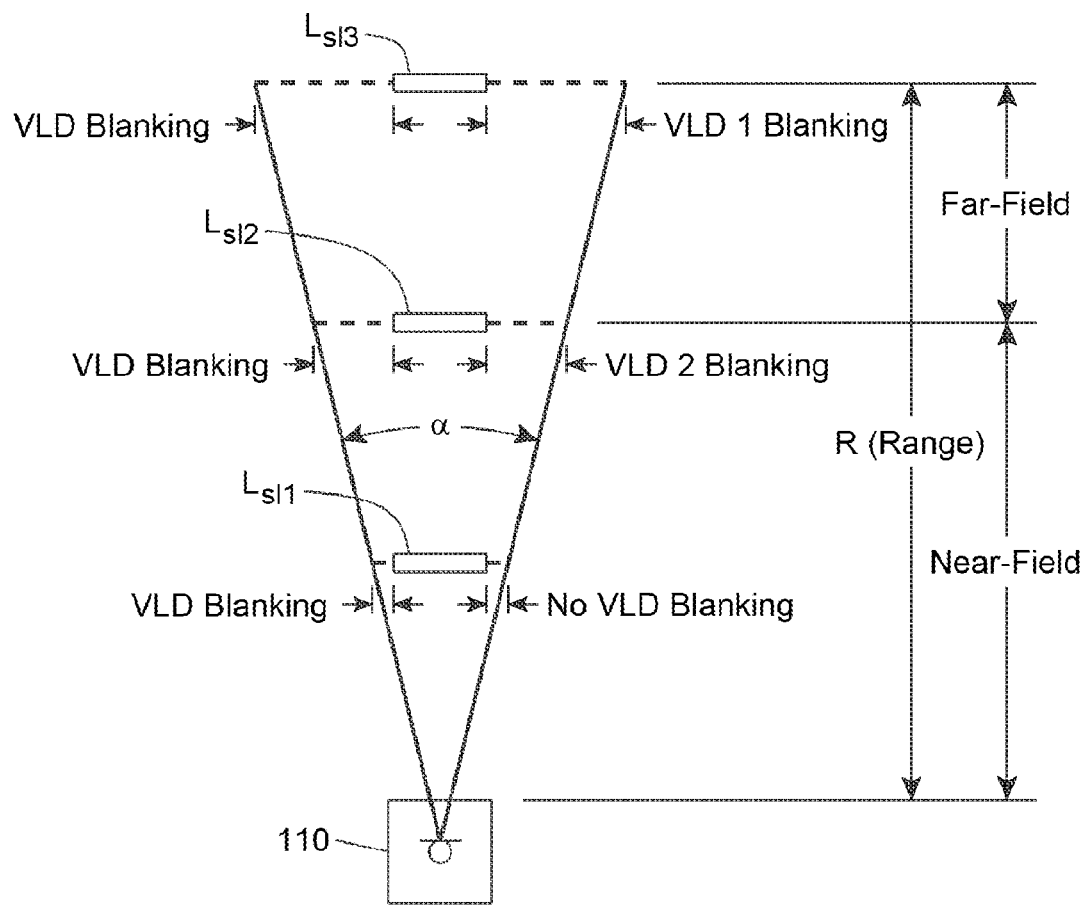
FIG. 9 is a schematic representation of the dual-VLDs in the laser scanning bar code symbol reading system of FIG. 6, generating and projecting three different laser scanning beams onto an object at three different scanning distances or ranges, so that a relatively constant length laser scan line is projected onto the object independent of scanning distance.

As shown in FIGS. 6 and 7, the automatically-triggered laser scanning bar code symbol reader 500 has a working distance, and an assembly of components comprising: a hand-supportable housing 102 having a head portion and a handle portion supporting the head portion; a light transmission window 103 integrated with the head portion of the housing 102; a IR-based (or LED-based) object detection and range subsystem 219 generating an IR or LED based light beam within the working range of the laser scanning field, as shown in FIG. 6, for automatically detecting the presence of an object in the laser scanning field, sending signals to the controller 150 when an object is automatically detected in the scanning field, and the system controller 150 activating the near-field VLD 112A if the object is detected in the near-portion of the scanning field, or the far-field VLD 112B if the object is detected in the far-portion of the scanning field; a laser scanning module 105, for repeatedly scanning, across the laser scanning field, a visible laser beam generated by either (i) a first laser source 112A (e.g. VLD or IR LD) having near-field optics to produce a laser scanning beam 113A focused in the near-portion of the laser scanning field, or (ii) a second laser source 112B (e.g. VLD or IR LD) having far-field optics to produce a laser scanning beam 113B focused in the far-portion of the laser scanning field, in response to control signals generated by a system controller 150; wherein the laser scanning module 105 also includes a laser drive circuit 151 for receiving control signals from system controller 150, and in response thereto, generating and delivering different laser (VLD) drive current signals to the near VLD 112A, or far VLD 112B, based on the detected or estimated distance or range R(t) of the scanned object in the scanning field; a start of scan/end of scan (SOS/EOS) detector 109, for generating timing signals indicating the start and stop of each laser beam sweep, and sending these SOS/EOS timing signals to the system controller 150, as well as decode processor 108; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure; a set of scan line data line buffers 160 for buffering each complete line of scan data collected during a complete sweep of the laser scanning beam across the laser scanning field during each scanning cycle (i.e. for both scanning directions); programmed decode processor 108 for decode processing digitized data stored in said scan line data buffer 160, and generating symbol character data representative of each bar code symbol scanned by the laser scanning beam; a scan data signal intensity detection module 143, preferably implemented within scan data processor/digitizer 143, for continuously (i) processing the return analog (or digital) scan data signals, (ii) detecting and analyzing the intensity (i.e. magnitude) of the laser return signal, (iii) determining (e.g. estimating) the range or distance R(t) of the scanned object, relative to the scanning window, and then (iv) transmitting the range indication (i.e. estimation) signal (e.g. in the form of a digital data value) to the VLD blanking control module 150A within controller 150, so that it can program or set an appropriate laser source (VLD) de-activation (i.e. blanking) function, B(t), for use by the laser drive circuit 151 to de-activate the laser source 112A, or 112B, at particular instances during each laser scanning cycle, so as to blank out (i.e. turn off) the laser scanning beam at such instances during the laser scanning cycle, according to the laser source blanking function B(t); an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

Preferably, IR-based (or VLD-based) object detection subsystem 219 is mounted in the front of its light transmission window 103 so that its IR light transmitter and IR light receiver components (or VLD light transmitter and receiver components) of subsystem 219 have an unobstructed view of an object within the laser scanning field of the system, as shown in FIG. 1. Also, the object presence detection module 219 can transmit into the scanning field 115, IR (or visible) signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

Notably, the VLD blanking function B(t) can be specified in a number of possible ways, including, but not limited to: (i) for symmetrical VLD blanking functions B(t), by specifying one percentage of time ($P_A$, $P_A$) measured from the center of each scanning cycle, indicating how long the VLD should be deactivated, during each scanning cycle having a total time duration $T_{SC}$; and (ii) for asymmetrical VLD blanking functions B(t), by specifying two different percentages of time ($P_A$, $P_B$) measured from the off-center location of each scanning cycle, indicating how long the VLD should be deactivated during each scanning cycle having a total time duration $T_{SC}$. The total time duration of each scanning cycle, $T_{SC}$, can be determined from the scanning speed of the scanning assembly which will be maintained substantially constant during scanning operations.

As shown in FIG. 7, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source (i.e. near-VLD) 112A for producing a visible laser beam 113A focused in the near-portion of the scanning field, and laser beam source (i.e. far-VLD) 112B for producing a visible laser beam 113B focused in the far-portion of the laser scanning field; and a beam deflecting mirror 114 for deflecting the laser beam 113A, or laser beam 113B, as incident beam 114A towards the mirror component of the laser scanning assembly 110, which sweeps the deflected laser beam 114B across the laser scanning field and a bar code symbol 16 that might be simultaneously present therein during system operation.

The laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, causing mirror component 134 to oscillate about its axis of rotation, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current $I_{DC}(t)$ produced by scanner drive circuit 111, the greater the forces exerted on permanent magnet 135 and its associated scanning element. Thus, scan sweep angle $\alpha(t)$ of the scanning module 105 can be directly controlled by controlling the level of drive current $I_{DC}(t)$ supplied to the electromagnetic coil 128 by the scanner drive circuit 111, under the control by scan drive current control module 150A, shown in FIG. 7. Locking the drive current $I_{DC}(t)$ will be the preferred method of controlling the scan sweep angle $\alpha(t)$ constant during scanning operation.

Preferably, the intensity detection module 143 is implemented within the scan data processor/digitizer 143 which may be realized as an ASIC chip, supporting both analog and digital type circuits that carry out the functions and operations performed therein. The function of the intensity detection module 143 is manifold: (i) constantly process the return analog (or digital) scan data signals and detecting and analyzing the intensity (i.e. magnitude) of the laser return signal; (ii) determine (e.g. estimate) the range or distance of the scanned object, relative to the scanning window, during each measuring period; and (iii) transmit a range/distance indication signal (e.g. in the form of digital data value) to the controller 150 for setting an appropriate VLD blanking function B(t) for the VLD drive circuit 151, dependent of the measured, detected or estimated distance or range R(t) of the scanned object.

The range or distance of the scanned object can be determined (e.g. estimated), relative to the scanning window, during each measuring period, by making a relative signal-to-noise (SNR) measurement, where the lowest SNR value can be assumed to correspond to the farthest possible scanning distance in the working range of the system (relative to the scanning window), and the highest SNR value can be assumed to correspond to the shortest possible scanning distance in the working range of the system. Notably, module 143 may include tables storing pre-calibrated scanning range vs. SNR values which can be used in such range/distance determinations, R(t). Also, the secondary effects of code density on the intensity of reflected (optical) scan data signals detected at the photo-detector can be factored into the range estimation process. In such an embodiment, the module 143 can also estimate the code density by analyzing transitions in the analog scan data signal, and the module 143 can then use tables, created for different ranges of code density, containing pre-calibrated scanning range vs. SNR values. These tables can be used to estimate scanned object range, given an estimated code density range and SNR measurement by module 143.

In general, system 500 supports an automatically-triggered mode of operation, and a method of bar code symbol reading as described below.

In response to the automatic detection of the object in the scanning field, the laser scanning module 105 generates and projects a laser scanning beam through the light transmission window 103, and across the laser scanning field 115 external to the hand-supportable housing, for scanning an object in the scanning field. Depending on where the object is detected within the scanning field, the laser scanning beam is generated by the laser source 112A or laser source 112B in response to control signals generated by the system controller 150. The scanning element (i.e. mechanism) 134 repeatedly scans the laser beam 113A or 113B across the object in the laser scanning field, at a constant scan sweep angle set by the controller 150 for the duration of the scanning process. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. Within the analog scan data signal processor/digitizer 107, the intensity detection module 143 performs the following functions: (i) constantly processes the return analog (or digital) scan data signals; (ii) detects and analyzes the intensity (i.e. magnitude) of the laser return signal; (ii) determines (e.g. estimates) the range or distance of the scanned object, relative to the scanning window, during each measuring period; and (iv) transmits a range/distance indication signal (e.g. in the form of digital data values) to the controller 150 for setting an appropriate VLD blanking function B(t) for the VLD drive circuit 151, based on the detected scanning distance R(t), at any instant in time. The VLD blanking function B(t) specifies when, during each laser scanning cycle, the VLD 112A will be automatically deactivated (i.e. de-energized) by the laser drive circuit 151, and thus, when visible laser light will not be produced and emitted into the scanning field, as the electromagnetic scanning assembly 110 attempts to sweep a laser scanning beam across the laser scanning field and any object along its scanning path, during specified laser blanking intervals.

To implement the VLD blanking function B(t), the firmware within system controller 150 detects the start of scan (SOS) signal from SOS/EOS detector 109, which signals the beginning of each new scan line. The firmware in programmed controller 150 is also able to compute the approximate time associated with a full scan line, based on the scanning speed of the laser scanning mechanism. In the illustrative embodiment, the approximate time duration of a full scan line, $T_{SL}$, is 10 milliseconds, but may vary from embodiment to embodiment. Based on this full scan line time duration $T_{SL}$ and the range of the scanned object R(t), the firmware looks up the specified VLD blanking function B(t) specified by the estimated range R(t), and from this VLD blanking function, determines the required VLD blanking percentages, and uses these figures to control the VLD drive circuit 151, to de-energize and energize the VLD during the scan sweep to produce the desired laser beam blanking effect along the projected laser scan line. For example, if the blanking percentage is 10, then the VLD drive circuit 151 will blank the VLD for 10 percent of the 10 milliseconds of the scan sweep time duration, which is total of 1 milliseconds of the scan sweep time duration. The controller firmware would then blank the VLD for the first 0.5 milliseconds and the last 0.5 milliseconds of the scan sweep time duration of the laser scanning beam to produce the desired laser beam blanking effect along the projected laser scan line.

The analog scan data signal processor/digitizer 107 also processes the analog scan data signal and converts the processed analog scan data signals into digitized data signals. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

As indicated above, the VLD blanking function B(t) for the laser scanning beam is determined by the range R(t) of the scanned object in the scan field, at any given moment in time. The range measure or estimate can be determined in at least two different ways: (i) by processing collected returned laser scan signals; or (ii) using range data produced by an LED or IR based object detection/range detection mechanism. In the case of processing return laser scanning signals, the laser light signal is converted to an electrical signal which is fed into module 143 in the analog scan data signal processor/digitizer 107. The strength of the processed analog or digital scan data signal, or the signal-to-noise ratio (SNR), is calculated and then used to estimate the distance/range of a scanned bar code symbol by the ASIC chip processor 107. A strong signal or a high ratio usually corresponds to a shorter range/distance, whereas a weak signal or low ratio corresponds to a larger range/distance. The VLD blanking function B(t) can then be dynamically adjusted based on the signal strength or SNR, and a predetermined table/algorithm implemented in ASIC chip 107. Below is an exemplary table that is provided to illustrate the relationship among these three parameters, described above, for the case of an asymmetric VLD blanking function B(t). These parameters can be tailored for scanners having different working ranges.

| Signal strength or SNR determined as a % of the predetermined Maximum strength or SNR value | Distance/Range R(t) between Scanner and a scanned bar code symbol | Asymmetric VLD Blanking Function B(t) Defined During The Time Period of A Full Scanning Cycle (i.e. Full Scan Line) |
|---|---|---|
| 95% | 2 inch | $B1 = \{P_A(R_1), P_B(R_1)\}$ |
| ... | ... | ... |
| 50% | 1 foot | $Bn = \{P_A(Rn), P_B(Rn)\}$ |
| ... | ... | ... |
| 10% | 2 feet | $B_N = \{P_A(R_N), P_B(R_N)\}$ |

Notably, the dynamically-defined VLD blanking (i.e. deactivation) function B(t) is a function of object scanning range R(t) which can and typically will vary at any instant in time during scanning operations. Therefore, it is understood that the time duration of the dynamically-programmed VLD blanking function B(t) will also change over time, and be dependent on the object range/distance R(t) determined by module 143 in the analog scan data processor/digitizer ASIC chip 107, as described above.

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 10A:
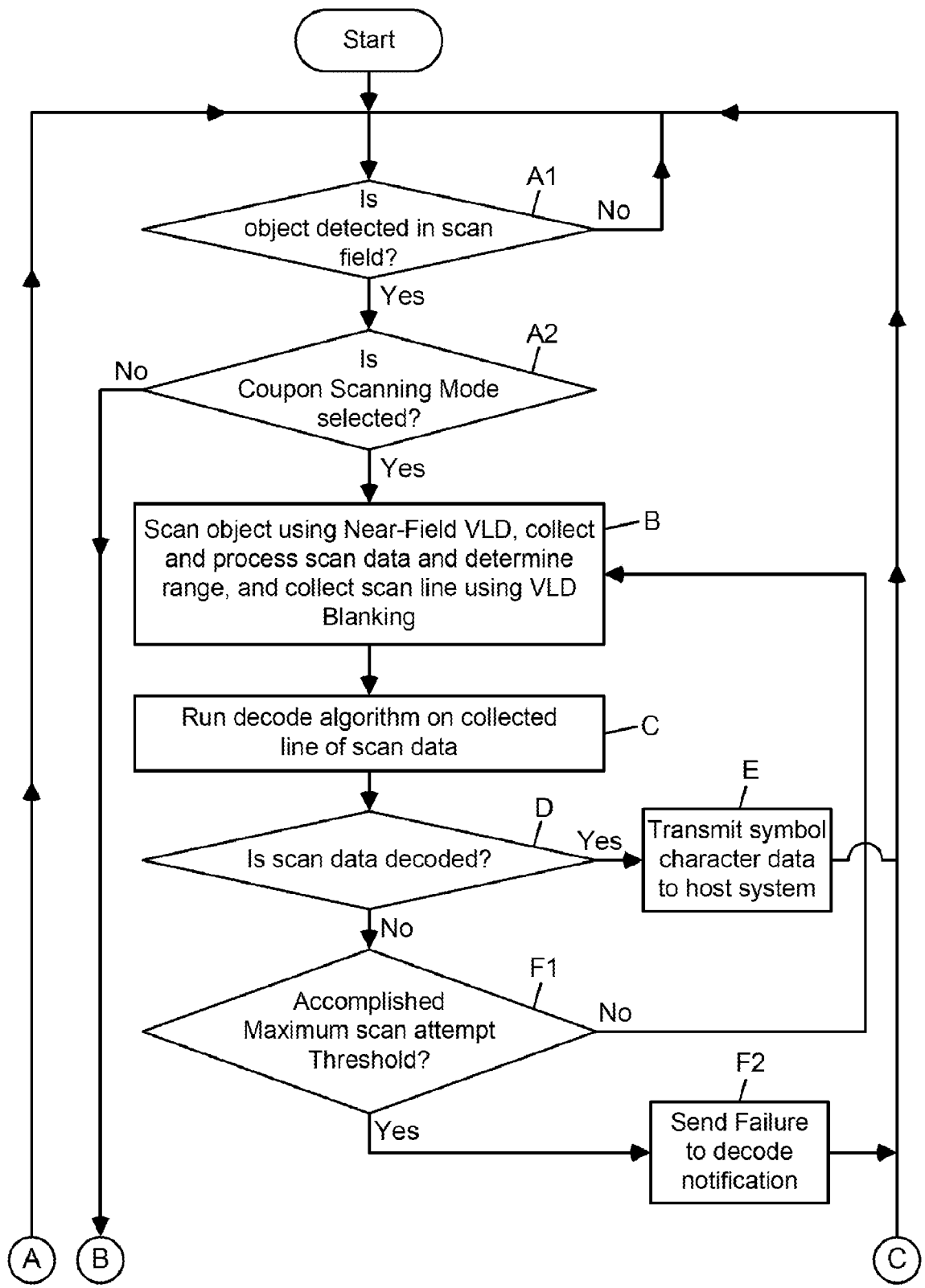
FIGS. 10A and 10B is a flow chart describing the primary steps carried out in the laser scanning bar code symbol reading system of FIG. 11, during each laser scanning cycle regardless of where the object is located within the scanning field of the system.

Referring to FIG. 10A, the method of reading bar code symbols and controlling operations within the laser scanning bar code reader 50 will be described in greater detail.

As indicated in FIG. 10A, the process orchestrated by system controller 150 begins at the START Block, where all system components are activated except for the laser and scanning motor (i.e. electromagnetic coil). Then at Block A1 in FIG. 10A, the system controller determines if an object is detected in the scan field. In the event that an object has been detected at Block A1, then the system controller proceeds to Block A2, and determines whether the detected object has been detected in the near-portion of the scanning field. If so, then at Block B, the system controller (i) activates the laser diode, and scanner drive circuit 111 with a sufficient current to generate a default scan sweep angle $\alpha_o(t)$ for the near-portion of the scanning field, (ii) then starts timeout period timer T1, (iii) scans the object using the near-field VLD, (iv) collects and processes scan data to determine the range or distance of the scanned object from the scanning window, and (v) and then sets the VLD blanking function B(t) for the measured or estimated range R(t), and then collects and processes a line of scan data from the object at the detected range. The system controller commands buffering, in the scan data buffer 160, a complete line of scan data collected for scanning directions, over a full scan sweep angle set during the current scanning cycle. Scan data from each scan direction is buffered in a different scan line data buffer. At Block C, the decode processor runs a decode algorithm on the collected and buffered line of scan data.

At Block D, the system controller determines whether the decode processor 108 has decoded a bar code symbol based on the line of scan collected and buffered in the scan data buffer 160. If, at Block D, a bar code symbol has been decoded (i.e. read) within the buffered line of scan data, then at Block E, the system controller transmits symbol character data to the host system, and returns to Block A1. If, at Block D, a bar code symbol has not been decoded (i.e. read) within the buffered line of scan data, then at Block F1 the system controller determines whether or not the time out period T1 has been reached (i.e. maximum scan threshold has been reached or accomplished). If the time out period has not been reached, then the system controller returns to Block B, processes the scan data signals, determines the object range and updates the scan angle of the laser scanning beam, and attempts to collect and decode scan data within time period T1 remaining. If the time out period has been reached, then the system controller proceeds to Block F2, sends a failure to decode notification, and can de-activate the laser source and scan motor (if programmed to do so), and then returns to Block A1, as shown.

If at Block A2 in FIG. 10A, the detected object is not detected within the near-portion of the scanning field, then the system controller proceeds to Block G, and controller (i) (re)activates the laser diode, and scanner drive circuit 111 to generate a constant scan sweep angle $\alpha_o(t)$ for the far-portion of the scanning field, (ii) starts timeout period timer T1, (iii) scans the object using the far-field VLD, (iv) collects and processes scan data to determine the range or distance R(t) of the scanned object from the scanning window, and (v) then sets the VLD blanking function B(t) for the measured or estimated range R(t), and collects and processes a line of scan data from the object at the detected range. The system controller commands buffering, in the scan data buffer 160, a complete line of scan data collected for scanning directions, over a full scan sweep angle set during the current scanning cycle. Scan data from each scan direction is buffered in a different scan line data buffer. At Block H, the decode processor runs a decode algorithm on the collected and buffered line of scan data.

At Block I, the system controller determines whether the decode processor 108 has decoded a bar code symbol based on the line of scan collected and buffered in the scan data buffer 160. If, at Block I, a bar code symbol has been decoded (i.e. read) within the buffered line of scan data, then at Block J, the system controller transmits symbol character data to the host system, and returns to Block A1. If, at Block I, a bar code symbol has not been decoded (i.e. read) within the buffered line of scan data, then at Block K the system controller determines whether or not the time out period T1 has been reached (i.e. maximum scan threshold has been reached or accomplished). If the time out period has not been reached, then the system controller returns to Block G, processes the scan data signals, determines the object range and updates the VLD blanking function B(t) for the detected scanning distance R(t), and attempts to collect and decode scan data within time period T1 remaining. If the time out period has been reached, then the system controller proceeds to Block L, sends a failure to decode notification, and can de-activate the laser source and scan motor (if programmed to do so), and then returns to Block A1, as shown.

Figure 10B:
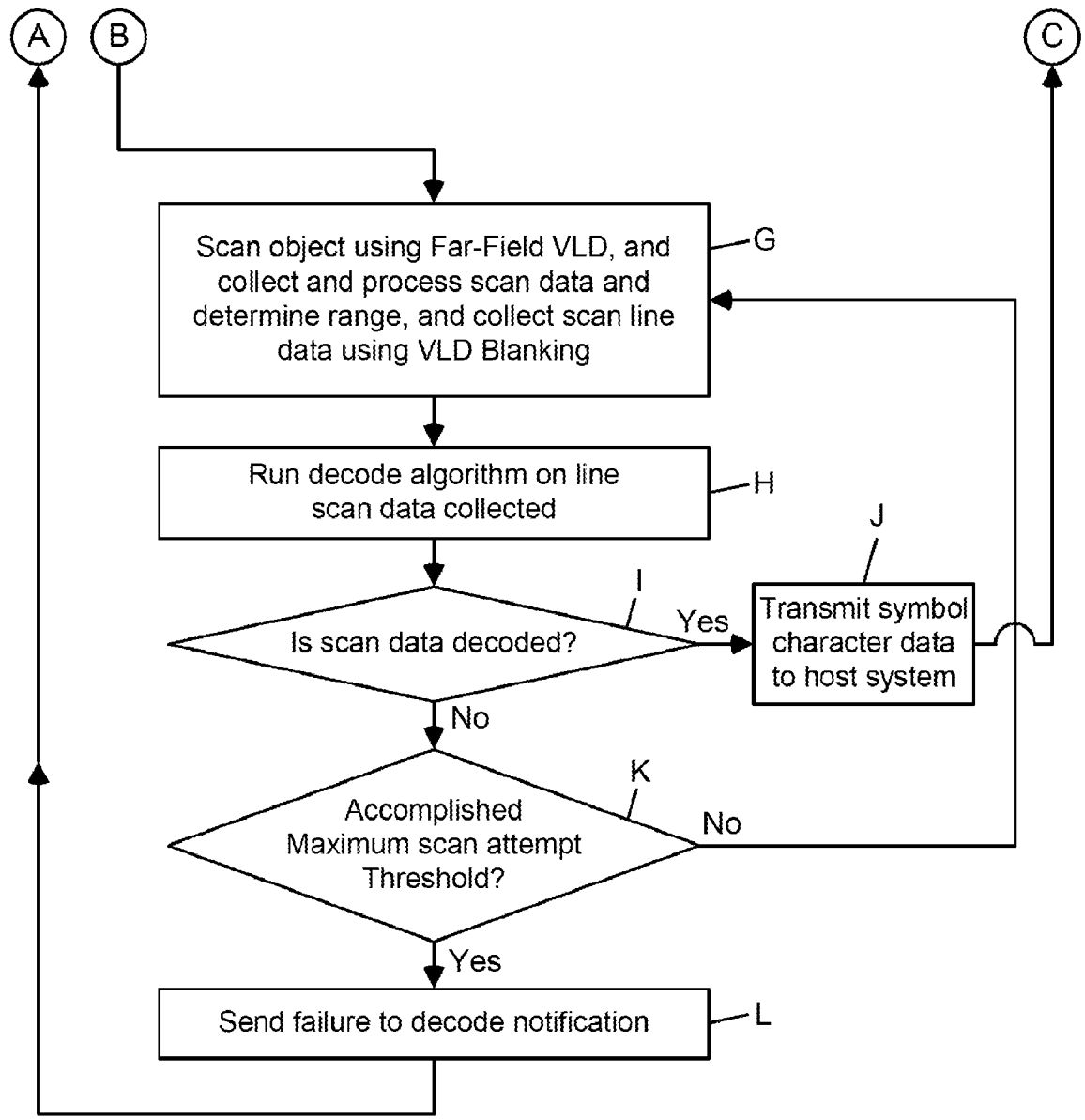

By virtue of the novel control process described in FIGS. 10A and 10B, the bar code symbol reader has the capacity to dynamically adjust the time a visible laser scanning beam is actively emitted and not emitted from the VLD 112A or 112B 112A during each laser scanning cycle, so as to control and/or maintain the length and intensity characteristics of a scan line projected onto the scanned object during the bar code symbol reading process. In some applications, the scan line length $L_{SL}$ can be maintained substantially constant on the scanned object regardless of the scanning distance R(t). In other embodiments, the scan line length $L_{SL}$ on the scanned object may be maintained substantially constant within predetermined limits for different detected ranges of scanning distance R(t). In yet other embodiments, the end of each scan line can be truncated to eliminate bright or hot spots as the laser scanning beam reverses its direction during scanning operations.

Manually-Triggered Hand-Supportable Laser Scanning Code Symbol Reading System Employing Range-Dependent Laser Source De-Activation (i.e. Blanking) Control Referring now to FIGS. 11 through 12, a third illustrative embodiment of a manually-triggered hand-supportable laser scanning bar code symbol reading system 1 will be described in detail. As will be described in the third illustrative embodiment below, range-dependent laser source de-activation (i.e. blanking) is used within the system 700 to control the length of each laser scan line projected onto an object at any scanning distance, so that the scan line length is substantially constant over the working distance of a single-VLD laser scanning system. It is understood, however, that range-dependent laser source de-activation (i.e. blanking) can be also used to achieve other kinds of scan line length and intensity control during each laser scanning cycle within a laser scanning system.

Figure 11:
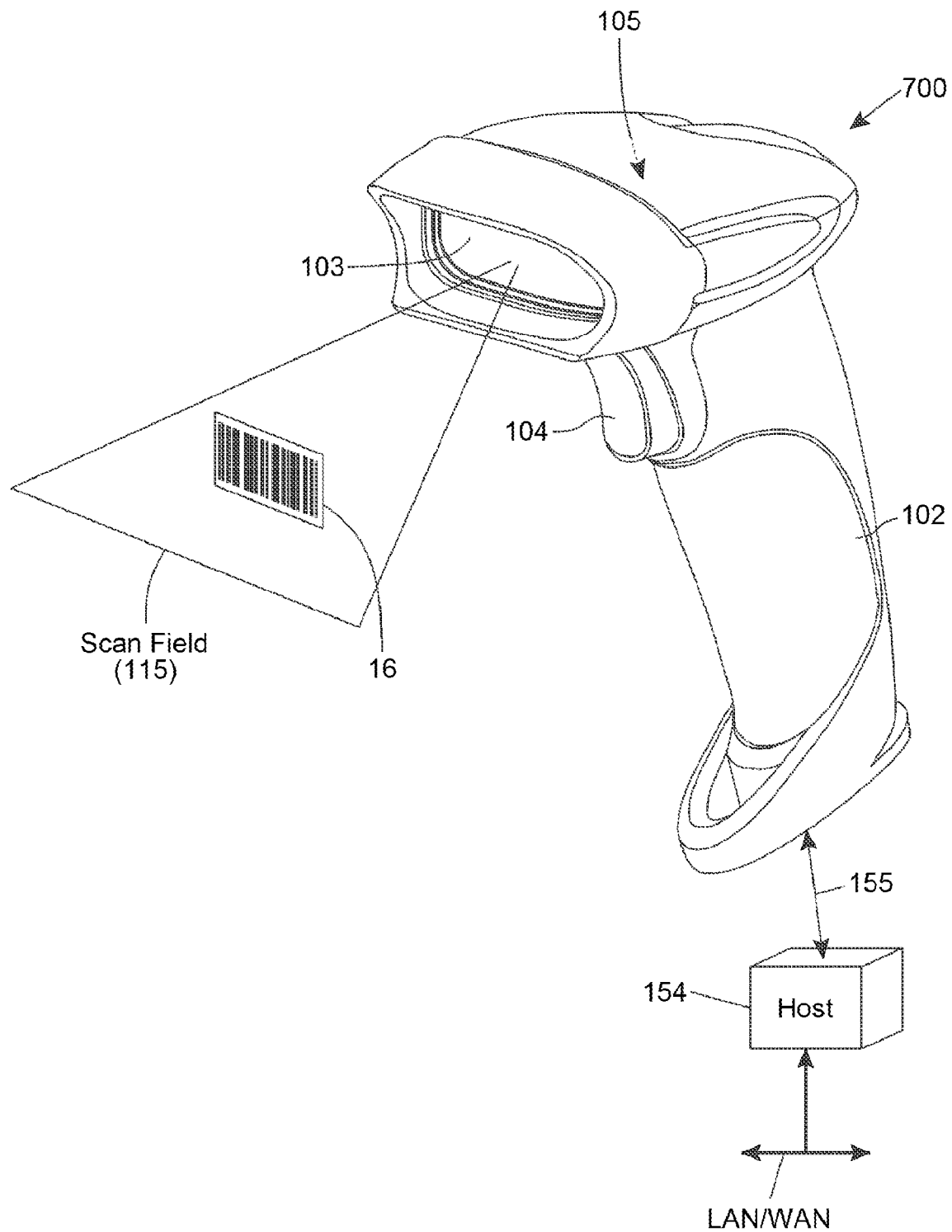
FIG. 11 is a perspective view of a third illustrative embodiment of a manually-triggered hand-supportable laser scanning bar code symbol reading system having the capacity to automatically control the length and intensity characteristics of a projected laser scan line at any instant in time, in a manner dependent on programming parameters and/or operating conditions, including the determined/estimated range of the scanned object in the field of view of the system during system operation.
Figure 12:
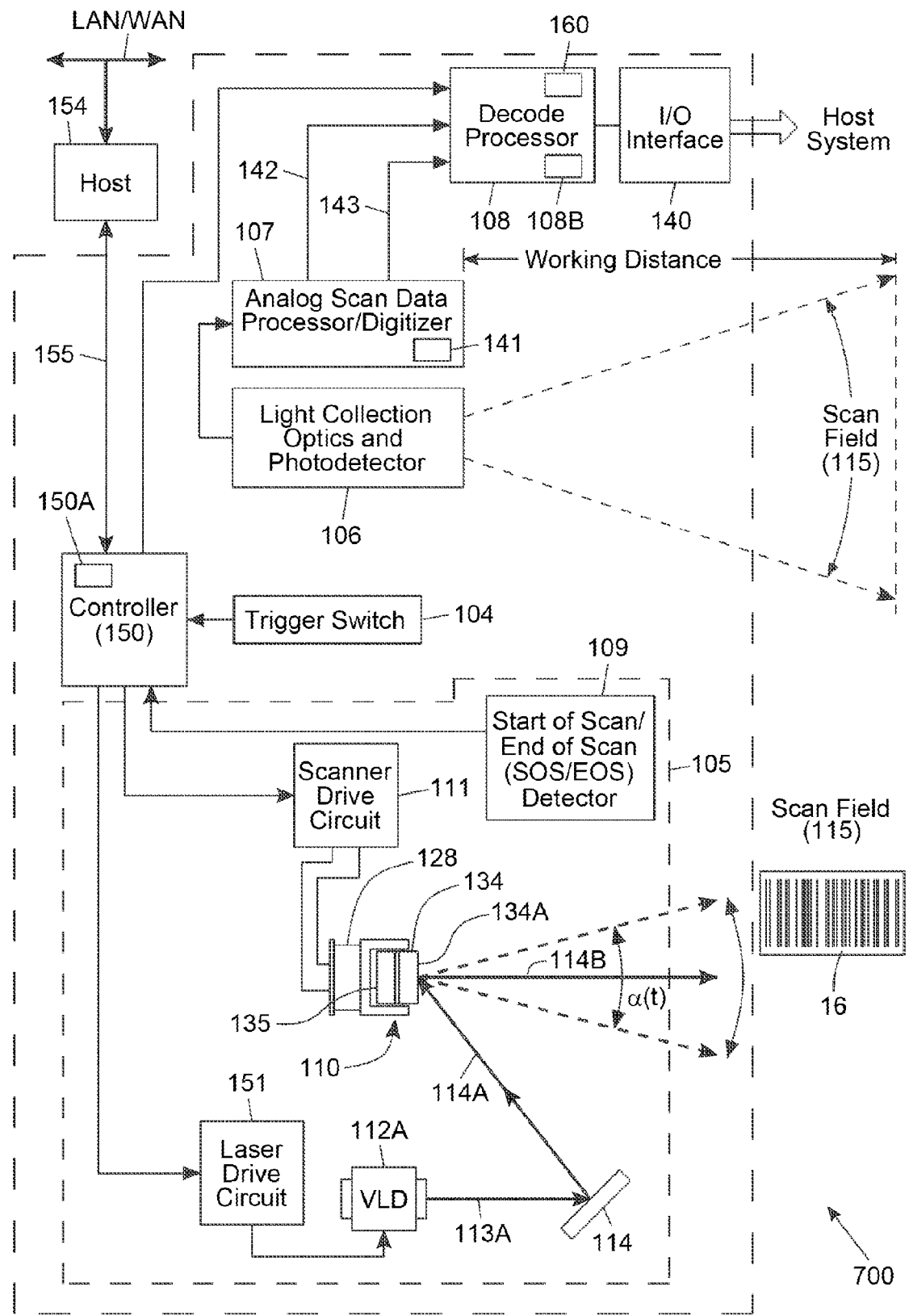
FIG. 12 is a schematic block diagram describing the major system components of the manually-triggered laser scanning bar code symbol reading system illustrated in FIG. 11.
Figure 13:
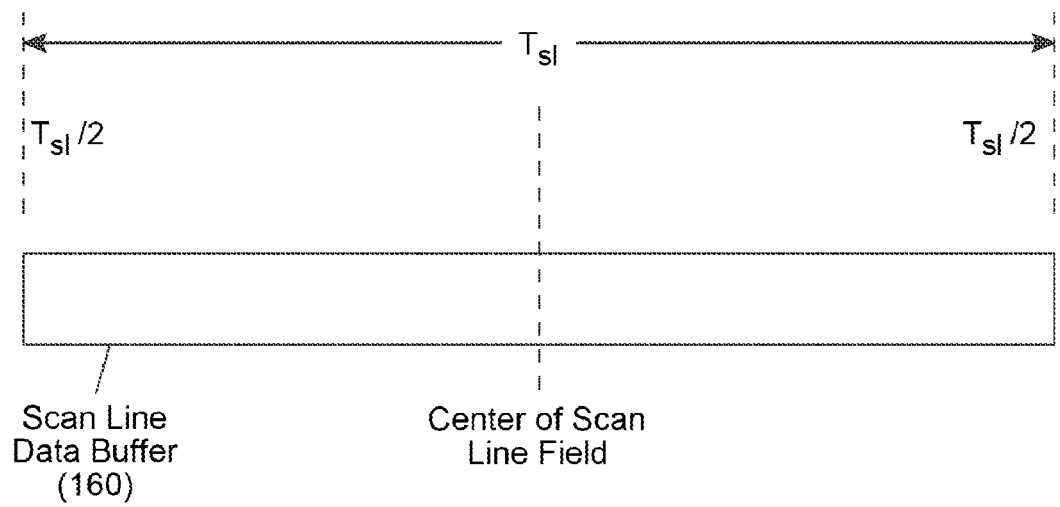
FIG. 13 is a schematic representation of a scan line data buffer maintained by the decode processor of the system of FIG. 11 during laser scanning operations, and holding a line of digital scan data for each laser scan direction during each laser scanning cycle.
Figure 14:
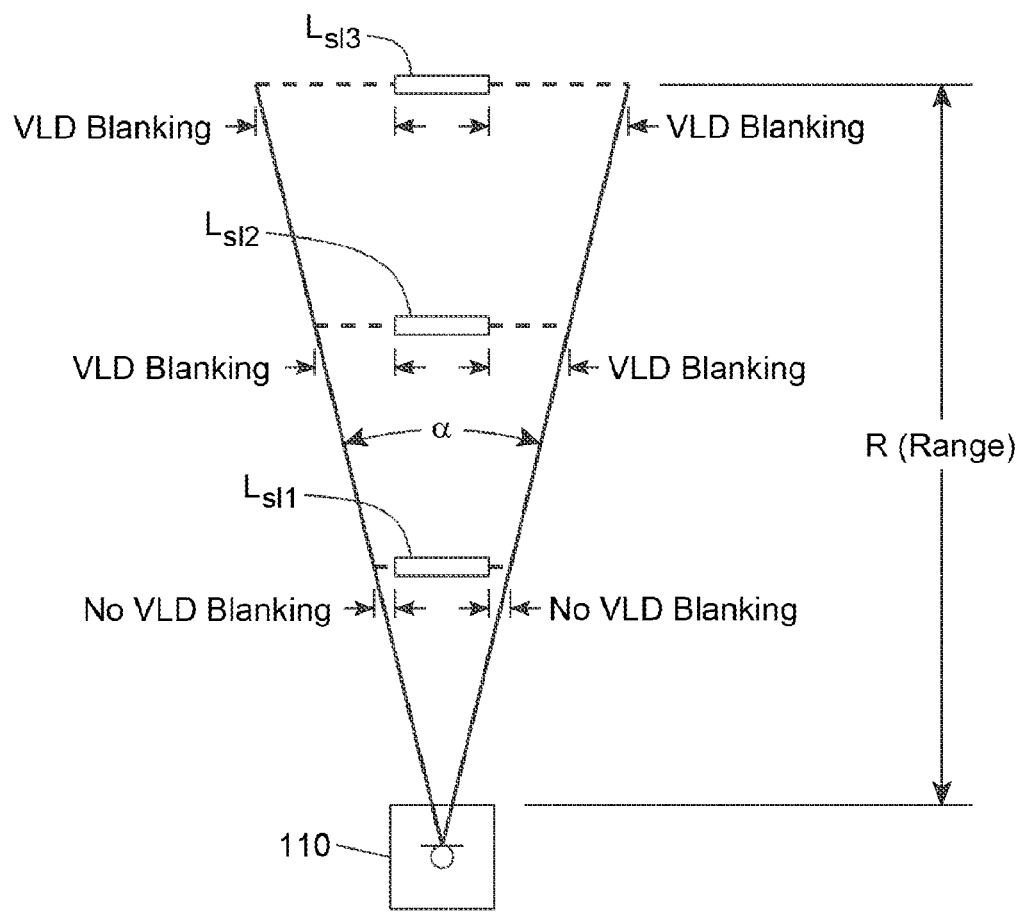
FIG. 14 is a schematic representation of a VLD in the laser scanning bar code symbol reading system of FIG. 11, generating and projecting three different laser scanning beams onto an object at three different scanning distances or ranges, so that a relatively constant length laser scan line is projected onto the object independent of scanning distance, by de-activating the laser beam at different times during the scanning cycle, based on the estimated object scanning distance.

As shown in FIGS. 11 and 12, the manually-triggered laser scanning bar code symbol reader 700 has a working distance, and an assembly of components comprising: a hand-supportable housing 102 having a head portion and a handle portion supporting the head portion; a light transmission window 103 integrated with the head portion of the housing 102; a manually-actuated trigger switch 104 integrated with the handle portion of the housing, for generating a trigger event signal to activate laser scanning module 105 with laser scanning field 115; a laser scanning module 105, for repeatedly scanning, across the laser scanning field, a visible laser beam generated by a laser source 112 (e.g. VLD or IR LD) having optics to produce a laser scanning beam focused in the laser scanning field, in response to control signals generated by a system controller 150; wherein the laser scanning module 105 also includes a laser drive circuit 151 for receiving control signals from system controller 150, and in response thereto, generating and delivering laser (diode) drive current signals to the laser source 112A; a start of scan/end of scan (SOS/EOS) detector 109, for generating timing signals indicating the start of laser beam sweep, and the end of each laser beam sweep, and sending these SOS/EOS timing signals to the system controller 150, as well as decode processor 108; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure and transmitted to decode processor 108 via lines 142; a scan data signal intensity detection module 143, preferably implemented within scan data processor/digitizer 143, for continuously (i) processing the return analog (or digital) scan data signals, (ii) detecting and analyzing the intensity (i.e. magnitude) of the laser return signal, (iii) determining (e.g. estimating) the range or distance R(t) of the scanned object, relative to the scanning window, and then (iv) transmitting the range indication (i.e. estimation) signal (e.g. in the form of a digital data value) to the VLD blanking control module 150A within controller 150, so that it can program or set an appropriate laser source (VLD) de-activation (i.e. blanking) function, B(t), for use by the laser drive circuit 151 to de-activate the laser source 112A at particular instances during each laser scanning cycle, so as to blank out (i.e. turn off) the laser scanning beam at such instances during the laser scanning cycle, according to the laser source blanking function B(t); a set of scan line data buffers 160 for buffering each complete line of scan data collected during a complete sweep of the laser scanning beam across the laser scanning field during each scanning cycle (e.g. two scan data line buffers for buffering data collected during scanning directions); programmed decode processor 108 for decode processing digitized data stored in said scan line data buffer 160, and generating symbol character data representative of each bar code symbol scanned by the laser scanning beam; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

Notably, the VLD blanking function B(t) can be specified in a number of possible ways, including, but not limited to: (i) for symmetrical VLD blanking functions B(t), by specifying one percentage of time ($P_A$, $P_A$) measured from the center of each scanning cycle, indicating how long the VLD should be deactivated, during each scanning cycle having a total time duration $T_{SC}$; and (ii) for asymmetrical VLD blanking functions B(t), specifying two different percentages of time ($P_A$, $P_B$) measured from the off-center location of each scanning cycle, indicating how long the VLD should be deactivated during each scanning cycle having a total time duration $T_{SC}$. The total time duration of each scanning cycle, $T_{SC}$, can be determined from the scanning speed of the scanning assembly which will be maintained substantially constant during scanning operations.

As shown in FIG. 12, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A as incident beam 114A towards the mirror component of the laser scanning assembly 110, which sweeps the deflected laser beam 114B across the laser scanning field and a bar code symbol 16 that might be simultaneously present therein during system operation.

As shown in FIG. 12, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current $I_{DC}(t)$ supplied to the electromagnetic coil 128 during scanning operations. In general, the greater the level of drive current $I_{DC}(t)$ produced by scanner drive circuit 111, the greater the forces exerted on permanent magnet 135 and its associated scanning element. Thus, scan sweep angle $\alpha(t)$ of the scanning module 105 can be directly controlled by controlling the level of drive current $I_{DC}(t)$ supplied to the coil 128 by the scanner drive circuit 111 under the control of controller 150, shown in FIG. 2. In the present disclosure, locking the drive current $I_{DC}(t)$ will be the preferred method of controlling (i.e. maintaining constant) the scan sweep angle $\alpha(t)$ during scanning operations.

Preferably, the intensity detection module 143 is implemented within scan data processor/digitizer 107 which may be realized as an ASIC chip, supporting both analog and digital type circuits that carry out the functions and operations performed therein. The function of the intensity detection module 143 is manifold: (i) constantly processing the return analog (or digital) scan data signals and detecting and analyzing the intensity (i.e. magnitude) of the laser return signal; (ii) determining (e.g. estimating) the range or distance of the scanned object, relative to the scanning window, during each measuring period; and (iii) transmitting a range/distance indication signal (e.g. in the form of digital data value) to the system controller 150 for setting an appropriate VLD blanking (i.e. deactivation) function B(t) for the laser beam being scanned across an object within the scanning field. Preferably, the range or distance of the scanned object R(t) can be determined (e.g. estimated), relative to the scanning window, during each measuring period, by making a relative signal-to-noise (SNR) measurement, where the lowest SNR value corresponds to the farthest possible scanning distance in the working range of the system (relative to the scanning window), and the highest SNR value corresponds to the shortest possible scanning distance in the working range of the system. Notably, module 143 may include tables storing pre-calibrated scanning range vs. SNR values which can be used in such range/distance determinations.

Also, the secondary effects of code density on the intensity of reflected (optical) scan data signals detected at the photo-detector can be factored into the range estimation process. In such alternative embodiments, the module 143 can also estimate the code density by analyzing transitions in the analog scan data signal, and the module 143 can then use tables, created for different ranges of code density, containing pre-calibrated scanning range vs. SNR values. These tables can be used to estimate scanned object range, given an estimated code density range and SNR measurement by module 143.

In general, system 700 supports a manually-triggered mode of operation, and a bar code symbol reading method described below.

In response to the manual actuation of trigger switch 104, the laser scanning module 105 generates and projects a laser scanning beam through the light transmission window 103, and across the laser scanning field 115 external to the hand-supportable housing, for scanning an object in the scanning field. The laser scanning beam is generated by the laser source 112B in response control signals generated by the system controller 150. The scanning element (i.e. mechanism) 134 repeatedly scans the laser beam across the object in the laser scanning field, at the constant scan sweep angle $\alpha(t)$ set by the controller 150 during scanning operation. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. Within the analog scan data signal processor/digitizer 107, the intensity detection module 143 performs the following functions: (i) constantly processing the return analog (or digital) scan data signals; (ii) detects and analyzes the intensity (i.e. magnitude) of the laser return signal; (ii) determining (e.g. estimating) the range or distance of the scanned object R(t), relative to the scanning window, during each measuring period; and (iv) transmitting a range/distance indication signal (e.g. in the form of digital data values) to the controller 150 for use in setting an appropriate VLD blanking function B(t) for the laser drive circuit 151, based on the detected scanning distance or range, R(t), at any instant in time. The VLD blanking function B(t) specifies when, during each laser scanning cycle, the VLD 112A will be automatically deactivated (i.e. de-energized) by the laser drive circuit 151, and thus, when visible laser light will not be produced and emitted into the scanning field, as the electro-magnetic scanning assembly 110 attempts to sweep a laser scanning beam across the laser scanning field and any object along its scanning path, during specified laser blanking intervals.

To implement the VLD blanking function B(t), the firmware within system controller 150 detects the start of scan (SOS) signal from SOS/EOS detector 109, which signals the beginning of each new scan line. The firmware in programmed controller 150 is also able to compute the approximate time associated with a full scan line, based on the scanning speed of the laser scanning mechanism. In the illustrative embodiment, the approximate time duration of a full scan line, $T_{SL}$, is 10 milliseconds, but may vary from embodiment to embodiment. Based on this full scan line time duration $T_{SL}$ and the range of the scanned object R(t), the firmware looks up the specified VLD blanking function B(t) specified by the estimated range R(t), and from this VLD blanking function, determines the required VLD blanking percentages, and uses these figures to control the VLD drive circuit 151, to de-energize and energize the VLD during the scan sweep to produce the desired laser beam blanking effect along the projected laser scan line. For example, if the blanking percentage is 10, then the VLD drive circuit 151 will blank the VLD for 10 percent of the 10 milliseconds of the scan sweep time duration, which is total of 1 milliseconds of the scan sweep time duration. The controller firmware would then blank the VLD for the first 0.5 milliseconds and the last 0.5 milliseconds of the scan sweep time duration of the laser scanning beam to produce the desired laser beam blanking effect along the projected laser scan line.

The analog scan data signal processor/digitizer 107 also processes the analog scan data signal and converts the processed analog scan data signals into digitized data signals. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

As indicated above, the VLD blanking function B(t) for the laser scanning beam is determined by the range R(t) of the scanned object in the scan field, at any given moment in time. The range measure or estimate can be determined in at least two different ways: (i) by processing collected returned laser scan signals; or (ii) using range data produced by an LED or IR based object detection/range detection mechanism. In the case of processing return laser scanning signals, the laser light signal is converted to an electrical signal which is fed into module 143 in the analog scan data signal processor/digitizer 107. The strength of the processed analog or digital scan data signal, or the signal-to-noise ratio (SNR), is calculated and then used to estimate the distance/range of a scanned bar code symbol by the ASIC signal processing chip 107. A strong signal or a high ratio usually corresponds to a shorter range/distance, whereas a weak signal or low ratio corresponds to a larger range/distance. The VLD blanking function B(t) can then be dynamically adjusted based on the signal strength or SNR, and a predetermined table/algorithm implemented in ASIC 107. Below is an exemplary table that is provided to illustrate the relationship among these three parameters, described above, for the case of a symmetric VLD blanking function B(t). These parameters can be tailored for scanners having different working ranges.

| Signal strength or SNR determined as a % of the predetermined Maximum strength or SNR value | Distance/Range R(t) between Scanner and a scanned bar code symbol | Symmetric VLD Blanking Function B(t) Defined During The Time Period of A Full Scanning Cycle (i.e. Full Scan Line) |
|---|---|---|
| 95% | 2 inch | $B1 = \{P_A(R_1), P_B(R_1)\}$ |
| ... | ... | ... |
| 50% | 1 foot | $Bn = \{P_A(Rn), P_B(Rn)\}$ |
| ... | ... | ... |
| 10% | 2 feet | $B_N = \{P_A(R_N), P_B(R_N)\}$ |

Notably, the dynamically-defined VLD blanking (i.e. deactivation) function B(t) is a function of object scanning range R(t) which can and typically will vary at any instant in time during scanning operations. Therefore, it is understood that the time duration of the dynamically-programmed VLD blanking function B(t) will also change over time, and be dependent on the object range/distance R(t) determined by module 143 in the analog scan data processor/digitizer ASIC chip 107, as described above.

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 15:
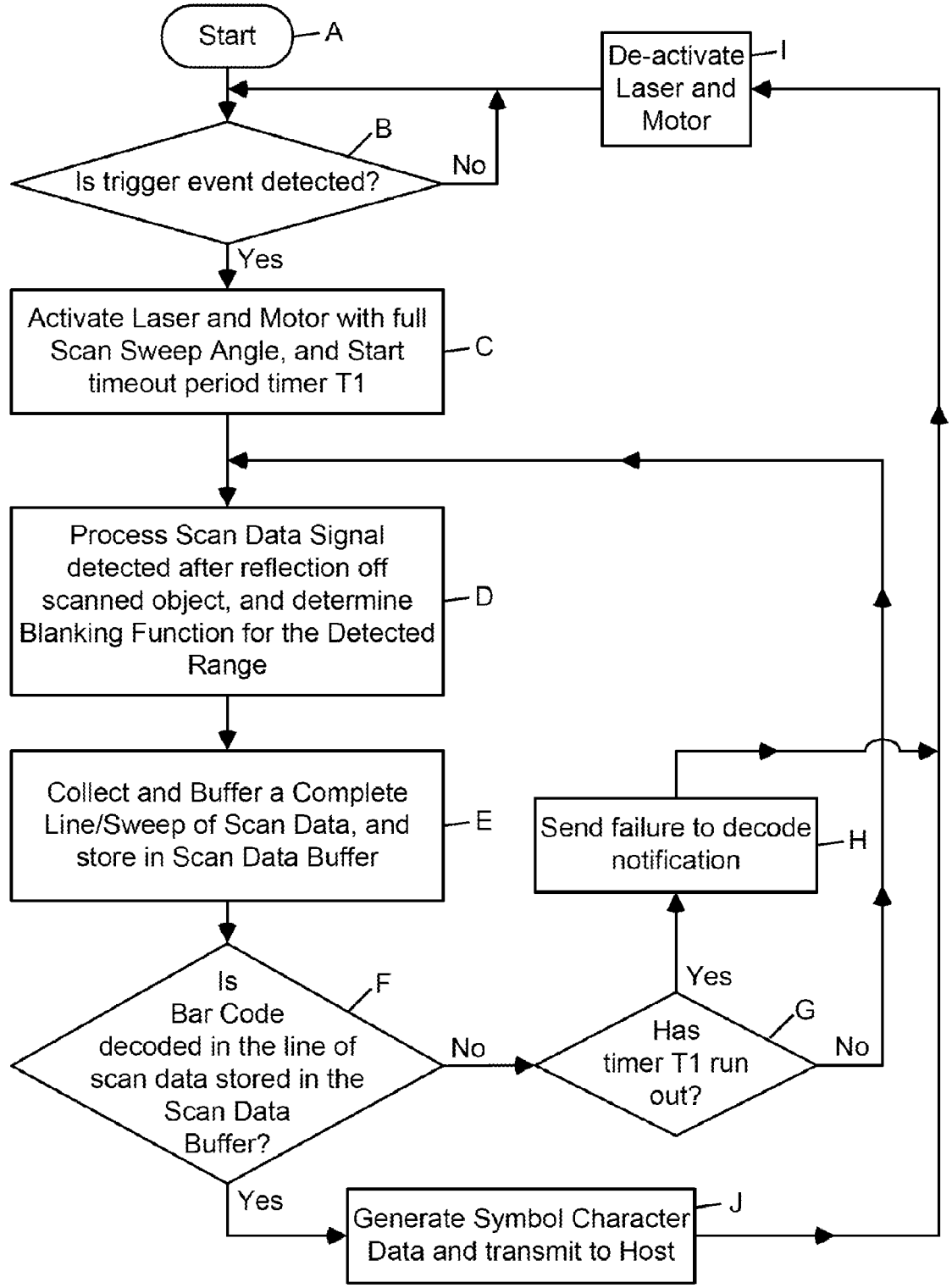
FIG. 15 sets forth a flow chart describing the primary steps carried out in the laser scanning bar code symbol reading system of FIG. 11, during each laser scanning cycle regardless of where the object is located within the scanning field of the system.

Referring to FIG. 15, the method of reading bar code symbols and controlling operations within the laser scanning bar code reader 100 will be described in greater detail.

As indicated in FIG. 15, the process orchestrated by system controller 150 begins at the START Block A, where all system components are activated except for the laser and scanning motor (i.e. electromagnetic coil). Then at Block B in FIG. 15, the system controller determines if a trigger or activation event has occurred (i.e. trigger switch 104 has been manually depressed by the operator).

In the event that a trigger event has been detected at Block B in FIG. 15, then the system controller proceeds to Block C, and (i) activates the laser diode, and scanner drive circuit 111 with a sufficient current to generate the specified scan sweep angle α (t) and (ii) then starts timeout period timer T1.

At Block D in FIG. 15, the analog scan data signal processor/digitizer ASIC 107 processes the return analog and/or digital scan data signals, and automatically (i) measures (e.g. estimates) the range or distance between the scanned object and the scanner, (ii) determines the VLD blanking function B(t) as a function of determined object range/distance R(t), and (iii) programs the VLD blanking function B(t) for the given moment of time during the control process.

At Block E in FIG. 15, the system controller commands the buffering, in a scan data buffer 160, of a complete line of scan data collected for scanning directions, over a full scan sweep angle during the current scanning cycle. Scan data from each scan direction is buffered in a different scan line data buffer.

At Block F in FIG. 15, the system controller determines whether the decode processor 108 has decoded a bar code symbol based on the line of scan collected and buffered in the scan data buffer 160.

If, at Block F in FIG. 15, a bar code symbol has not been decoded (i.e. read) within the buffered line of scan data, then the system controller proceeds to Block G and determines whether or not the time out period T1 has been reached. If the time out period has not been reached, then the system controller returns to Block D, processes the scan data signals, determines the object range and updates the VLD blanking function B(t), if necessary. Thereafter, the system controller proceeds to Block E and attempts to collect and decode scan data within time period T1 remaining. If the time out period has been reached at Block G, then the system controller proceeds to Block GH, sends a failure to decode notification to host system, and then at Block I, de-activates the laser source and scan motor, and then returns to Block B, as shown in FIG. 5.

By virtue of the novel control process described in FIG. 15, the bar code symbol reader has the capacity to dynamically adjust the time a visible laser scanning beam is actively emitted and not emitted from the VLD 112A during each laser scanning cycle, and thereby control and/or maintain the length and intensity characteristics of a scan line projected onto the scanned object during the bar code symbol reading process. In some applications, the scan line length $L_{SL}$ can be maintained substantially constant on the scanned object regardless of the scanning distance R(t). In other embodiments, the scan line length $L_{SL}$ on the scanned object may be maintained substantially constant within predetermined limits for different detected ranges of scanning distance R(t). In yet other embodiments, the end of each scan line can be truncated to eliminate bright or hot spots as the laser scanning beam reverses its direction during scanning operations.

Some Modifications which Readily Come to Mind

While the illustrative embodiments disclosed the use of a 1D laser scanning module to detect visible and/or invisible bar code symbols on objects, it is understood that a 2D or raster-type laser scanning module can be used as well, to scan 1D bar code symbols and 2D stacked linear bar code symbols, and generate scan data for decoding processing.

While hand-supportable laser scanning systems have been illustrated, it is understood that these laser scanning systems can be packaged in a portable or mobile data terminal (PDT) where the laser scanning engine begins to scan in response to receiving a request to scan from the host computer 154 within the PDT. Also, the laser scanning system can be integrated into modular compact housings and mounted in fixed application environments, such as within counter-top scanners, inside kiosk systems (i.e. kiosks), reverse-vending machines, wall-mounted code symbol reading systems, and within transportable systems (i.e. machines) such as forklifts where there is a need to scan code symbols on objects (e.g. boxes) that might be located anywhere within a large scanning range (e.g. up to 20+ feet away from the scanning system).

In such fixed mounted applications, the trigger signal can be generated by (i) automatically-actuated switches driven by IR or LED sensors, or (ii) manual switches located at remote locations (e.g. within the forklift cab near the driver) or anywhere not located on the housing of the system. Also, during fix-mount applications, the left side, the right side or the center portion of the laser scan line can be defined as the center of the VLD blanking function B(t) employed in the laser scanning module of the system.

Also, the illustrative embodiment have been described in connection with various types of code symbol reading applications involving 1-D and 2-D bar code structures (e.g. 1D bar code symbols and 2D stacked linear bar code symbols), it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

The invention claimed is:

1. A system for reading code symbols in a scanning field, comprising:
    a source for generating a light beam; and
    a scanning mechanism for scanning the light beam at a sweep angle across the scanning field and along a scan line during a scanning cycle;
    a drive circuit for supplying current to the scanning mechanism to achieve the sweep angle;
    a photo-detector for detecting the intensity of light reflected from the scanning field and generating a first signal corresponding to the detected light intensity; and
    a processor for estimating a distance between the system and an object in the scanning field based on the first signal and for generating data representative of indicia in the scanning field based on the first signal;
    wherein, during each scanning cycle, the source generates the light beam according to a blanking function determined by the estimated distance.

2. The system of claim 1, wherein the source does not generate the light beam at an end of the sweep angle.

3. The system of claim 1, wherein the scanning mechanism scans the light beam at a constant sweep angle.

4. The system of claim 1, wherein the blanking function achieves a predetermined length of the scan line based on the estimated distance.

5. The system of claim 4, wherein the predetermined length of the scan line is substantially constant for a range of estimated distances.

6. A system for reading code symbols in a scanning field, comprising:
    a source for generating a light beam; and
    a scanning mechanism for scanning the light beam at a sweep angle across the scanning field and along a scan line during a scanning cycle;
    a drive circuit for supplying current to the scanning mechanism to achieve the sweep angle;
    a module for estimating a distance between the system and an object in the scanning field;
    wherein, during each scanning cycle, the source generates the light beam according to a blanking function determined by the estimated distance.

7. The system of claim 6, wherein the source does not generate the light beam at an end of the sweep angle.

8. The system of claim 6, wherein the blanking function achieves a predetermined length of the scan line based on the estimated distance.

9. The system of claim 8, wherein the predetermined length of the scan line is substantially constant for a range of estimated distances.

10. The system of claim 6, wherein the module generates data representative of indicia in the scanning field based on the first signal.

11. A system for reading code symbols in a scanning field, comprising:
    a source for generating a light beam;
    a scanning mechanism for scanning the light beam at a sweep angle across the scanning field and along a scan line during a scanning cycle; and
    a processor for estimating a distance between the system and an object in the scanning field;
    wherein, during each scanning cycle, the source generates the light beam according to a blanking function.

12. The system of claim 11, wherein the source does not generate the light beam at an end of the sweep angle.

13. The system of claim 11, wherein the scanning mechanism scans the light beam at a constant sweep angle.

14. The system of claim 11, comprising a drive circuit for supplying current to the scanning mechanism to achieve the sweep angle.

15. The system of claim 11, comprising a module comprising the processor for estimating a distance between the system and an object in the scanning field, wherein the blanking function is determined by the estimated distance.

16. The system of claim 11, comprising a drive circuit for supplying current to the scanning mechanism based on the estimated distance.

17. The system of claim 15, wherein the blanking function achieves a predetermined length of the scan line based on the estimated distance.

18. The system of claim 17, wherein the predetermined length of the scan line is substantially constant for a range of estimated distances.

19. The system of claim 11, comprising:
- a photo-detector for detecting the intensity of light reflected from the scanning field and generating a first signal corresponding to the detected light intensity;
- wherein the processor estimates the distance between the system and an object in the scanning field based on the first signal; and
- wherein the blanking function is determined by the estimated distance.

20. The system of claim 19, wherein the processor generates data representative of indicia in the scanning field based on the first signal.

\* \* \* \* \*